(12) United States Patent
Mori

(10) Patent No.: US 8,276,703 B2
(45) Date of Patent: Oct. 2, 2012

(54) CHAIN ADJUSTMENT APPARATUS FOR MOTORCYCLE

(75) Inventor: Yotaro Mori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 276 days.

(21) Appl. No.: 12/685,985

(22) Filed: Jan. 12, 2010

(65) Prior Publication Data

US 2010/0181742 A1 Jul. 22, 2010

(30) Foreign Application Priority Data

Jan. 21, 2009 (JP) ................................ 2009-011442

(51) Int. Cl.
*B62M 9/16* (2006.01)
(52) U.S. Cl. ...................................... 180/231
(58) Field of Classification Search ................... 180/219, 180/231
See application file for complete search history.

(56) References Cited

U.S. PATENT DOCUMENTS

| | | | | |
|---|---|---|---|---|
| 5,240,087 A | * | 8/1993 | Parker ........................... | 180/231 |
| 5,888,159 A | * | 3/1999 | Liao .............................. | 474/116 |
| 5,964,312 A | * | 10/1999 | Maldonado .................... | 180/227 |
| 2005/0026731 A1 | * | 2/2005 | Skidmore et al. ............. | 474/116 |

FOREIGN PATENT DOCUMENTS

JP 63-48691 4/1988

* cited by examiner

*Primary Examiner* — Kevin Hurley
(74) *Attorney, Agent, or Firm* — Carrier Blackman & Associates, P.C.; Joseph P. Carrier; William D. Blackman

(57) ABSTRACT

A chain adjustment apparatus for a motorcycle includes a substantially C-shaped adjustment recess formed in an end piece member attached to a rear end portion of a rear fork. An adjustment member is slidably fitted in the adjustment recess. The adjustment member includes a projecting member having a substantially V-shaped projecting slope, and a recessed member having a substantially V-shaped recessed slope. The projecting member fits in the recessed member. When a wheel axle is passed through the adjustment member and the end piece member, the projecting member is brought into wedged engagement with the recessed member by axial force on the wheel axle, and upper and lower split bodies of the recessed member are moved, and pressed onto upper and lower face walls of the end piece member for increasing a coupling rigidity of the adjustment member with the end piece member.

13 Claims, 16 Drawing Sheets

PRIOR ART

CHAIN ADJUSTMENT APPARATUS FOR MOTORCYCLE

CROSS-REFERENCE TO RELATED APPLICATIONS

The present invention claims priority under 35 USC 119 based on Japanese patent application No. 2009-011442, filed on Jan. 21, 2009. The entire subject matter of this priority document, including specification claims and drawings thereof, is incorporated by reference herein.

BACKGROUND OF THE INVENTION

1. Field of the Invention

The present invention relates to a chain adjustment apparatus for a motorcycle. More particularly, the present invention relates to a chain adjustment apparatus which enhances a coupling rigidity of an adjustment member, through which a rear wheel axle is passed, with an end piece member attached to an end portion of a rear fork of a motorcycle.

2. Description of the Background Art

There is a known support structure for a rear wheel axle of a motorcycle. An example of such support structure is disclosed in the Japanese Patent Document JP-A No. S63-48691. FIG. 17 is a perspective view showing a support structure for a rear wheel axle according to the related art disclosed in the Japanese Patent Document JP-A No. S63-48691.

As shown in FIG. 17, an end piece member 108 is attached to the rear end portion of a rear fork 101 for supporting a rear wheel axle 103. The end piece member 108 is formed in a C-shaped cross section, and includes an upper face wall 108a, a side face wall 108b, and a lower face wall 108c. The side face wall 108b has an elongated opening 109 formed therein. An adjustment member 110 is fitted into a recess formed by a portion of the C-shaped end piece member 108 so as to freely move in the longitudinal direction, and positioning of its front end is effected by an adjustment bolt 111.

The rear wheel axle 103 having a long bolt-like shape extends through the adjustment member 110 and the elongated opening 109. Fastening a shaft end portion of the rear wheel axle 103 with a nut (not shown) causes the adjustment member 110 to be tightly fixed onto the side face wall 108b of the end piece member 108, and loosening the nut causes the adjustment member 110 to move in the longitudinal direction together with the rear wheel axle 103 to thereby adjust the tension of the chain. It is desired that the rear wheel axle 103 is supported firmly in an appropriate position during driving operation of a motorcycle. Accordingly, it is expected that the adjustment member 110 is firmly fastened the end piece member 108 for providing sufficient rigidity of fastening.

However, according to the art disclosed in the Japanese Patent Document JP-A No. S63-48691, while the adjustment member 110 is brought into pressure contact with the side face wall 108b of the end piece member 108 when fastening the rear wheel axle 103 for fixation, the force with which the adjustment member 110 is fastened to the end piece member 108 is provided by the axial force applied at the time of fastening of the rear wheel axle 103, and this axial force is applied to the adjustment member 110 from a head portion 103a and a flange 103b, thereby effecting friction coupling due to pressure contact solely by the surface contact portion between the adjustment member 110 and the side face wall 108b.

Moreover, considering the ease of movement at the time of adjustment, the contact between the upper and lower portions of the adjustment member 110 with the upper face wall 108a and lower face wall 108c of the end piece member cannot contribute to the coupling between the upper and lower portions of the adjustment member 110 with the upper face wall 108a and lower face wall 108c of the end piece member. In addition, a slight gap exists between a shaft portion 103c of the rear wheel axle 103 and a shaft hole in the adjustment member 110. Such slight gap between the shaft portion 103c of the rear wheel axle 103 and the shaft hole in the adjustment member 110 may be disadvantageous for achieving a desired coupled rigidity or for enhancing coupling rigidity.

Therefore, the axial force on the rear wheel axle 103 is applied to the adjustment member 110 from only the head portion 103a, and the rigidity of fastening of the adjustment member 110 to the end piece member 108 is enhanced by increasing a thickness of the adjustment member 110 and the end piece member 108, or the like. The rear wheel axle 103 includes a flange 103b a hexagonal portion 103e (FIG. 17).

It is also desired to enhance the coupling rigidity in order to prevent deformation of the support portion of the rear wheel axle 103. As a result, the device is enlarged in size, often leading to an increase in weight and cost.

The present invention has been made to overcome such drawbacks of the existing chain adjustment apparatus. Accordingly, it is one of the objects of the present invention to provide a chain adjustment device for firmly coupling the adjustment member and the end piece member together at the support portion of the rear wheel axle to thereby enhance coupling rigidity.

SUMMARY OF THE INVENTION

In order to achieve the above objects, the present invention provides a chain adjustment apparatus for a motorcycle. The chain adjustment device includes a rear fork, which is attached to a vehicle body or an engine so as to freely swing up and down, and which supports a rear wheel at a rear end thereof via a rear wheel axle; and a chain, which transmits a driving force of the engine to a driven sprocket of the rear wheel, in which the rear wheel axle extends through a elongated opening provided in an end piece member attached to a rear end portion of the rear fork, and through an adjustment member that is fitted so as to freely move forwards and backwards in an adjustment recess formed so as to be open at an outer lateral side of the end piece member, and tension of the chain is adjusted by adjusting a position of the adjustment member to cause the rear wheel axle to be moved while being guided by the elongated opening.

The adjustment member includes an axle hole through which the rear wheel axle is passed. The adjustment member is operable to move in an axial direction of the rear wheel axle. The adjustment member includes a projecting member having, in an inner side face facing toward an inner side of the vehicle body, a substantially V-shaped projecting slope whose vertically central portion projects toward the inner side of the vehicle body; an adjustment recess, arranged above and below the elongated opening, and having a substantially V-shaped recessed slope with which the substantially V-shaped projecting slope of the projecting member is brought into sliding contact; and the projecting member is fitted into the adjustment recess, and both the substantially V-shaped projecting slope and the substantially V-shaped recessed slope are brought into sliding contact with each other.

A portion having the substantially V-shaped recessed slope with which the projecting member is fitted may be formed as the recessed member separate from the end piece member.

The adjustment member may be formed by the projecting member and the recessed member, and the recessed member may fit into the adjustment recess having a substantially C-shaped cross section which is formed in a portion of the end piece member including the elongated opening. In addition, the projecting member can be split vertically in two portions.

Advantageous Effects of Invention

According to the present invention, the adjustment member is provided with a projecting member having a substantially V-shaped projecting slope, and the projecting member is fitted into the recessed member having a substantially V-shaped recessed slope which is arranged on the end piece member side. Thus, when the rear wheel axle is passed through the shaft hole in the adjustment member, and is tightened by fastening a nut to its distal end, the axial force on the rear wheel axle is transmitted from the head portion to the adjustment member, causing the adjustment member to be pushed inwards in the axial direction. Then, the substantially V-shaped projecting slope provided in the projecting member of the adjustment member is brought into sliding contact with the substantially V-shaped recessed slope of the recessed member, and bites into the substantially V-shaped recessed slope for wedged engagement.

Thus, the adjustment member is firmly coupled to the end piece member to thereby enhance coupling rigidity. It is thus possible to enhance coupling rigidity without increasing the thickness of the end piece member or the adjustment member more than necessary or providing more than necessary reinforcement using another reinforcing member. In addition, a reduction in the size and weight of the device can be also expected.

In addition, the recessed member can be formed as a vertically split recessed member that is separate from the end piece member, and the adjustment member can be formed by the recessed member and the projecting member. Since the recessed member is split vertically, when the projecting member is brought into wedged engagement with the recessed member, the split bodies of the recessed member are moved upwards and downwards and their upper and lower portions are pressed onto the upper and lower portions of the end piece member for surface contact. The inner side face of the recessed member is also pressed onto the end piece member for surface contact.

The increase of the surface contact portions enhances the coupling force with respect to the end piece member, thereby making it possible to increase the coupling rigidity of the adjustment member to the end piece member. Moreover, since all contacts take the form of surface contact, by fastening the rear wheel axle, the adjustment member and the end piece member become less susceptible to deformation, thereby making it possible to achieve a further reduction in thickness of the end piece member and the adjustment member.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Hereinbelow, illustrative embodiments of the present invention are described with reference to the attached drawings.

Figure 1:
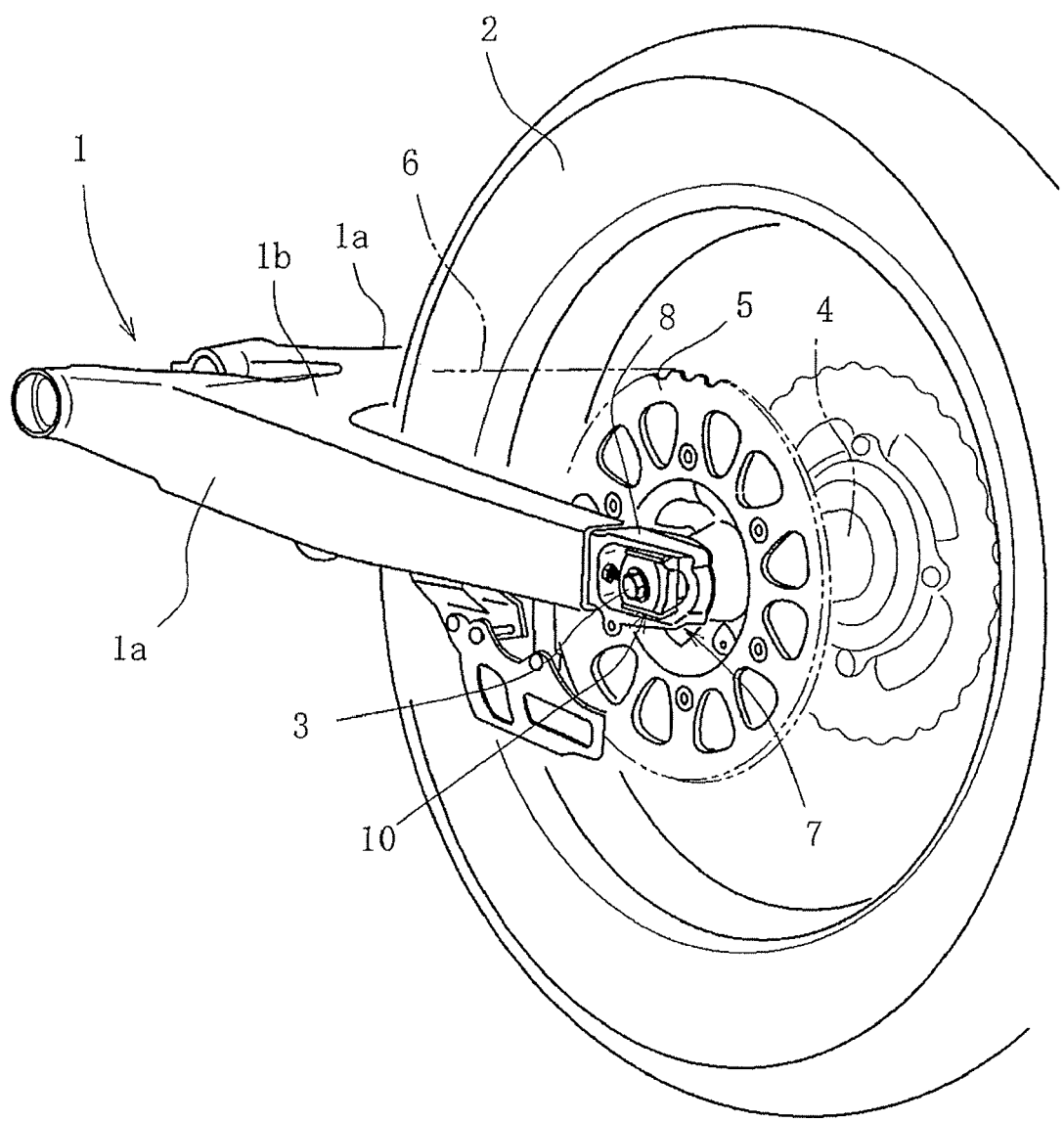
FIG. 1 is a perspective view showing the rear portion of a motorcycle according to an illustrative embodiment of the present invention.

A first illustrative embodiment of the present invention is described in relation to FIGS. 1 through 9. FIG. 1 is a perspective view showing the rear wheel portion of a motorcycle.

A rear fork 1 provided at a rear portion of a vehicle (motorcycle) body is made of metal such as light alloy. The rear fork 1 has a substantially gate shape, when viewed in a plan view. The rear fork 1 includes a pair of left and right arm portions 1a shaped like a square pipe, and a cross portion 1b for connecting the front portions of the arm portions 1a. A front end portion of the fork 1 is attached to a body frame or engine (not shown) so as to freely swing in the vertical direction. A rear wheel 2 is arranged between the left and right arm portions 1a. The rear wheel 2 is rotatably supported on a rear wheel axle 3 having both end portions thereof supported on the left and right arm portions 1a of the rear fork 1.

A hub 4 of a tire wheel constituting the rear wheel, has an axle hole 4a (FIG. 6) at a center portion thereof extending therethrough in the vehicle width direction. The rear wheel axle 3 extends through the axle hole 4a in the lateral direction. A driven sprocket 5 is attached to one side end portion of the hub 4. A chain 6 is wound around the driven sprocket 5 and an driving sprocket (not shown) on the engine side. The rear wheel 2 is driven through transmission of power from the engine via the chain.

The tension of the chain 6 is adjusted by a chain adjustment mechanism 7. The chain adjustment mechanism 7 is operable to maintain a tension of the chain 6 constant by moving the rear wheel axle 3 rearwards when the chain 6 is elongated due to long use or the like. The chain adjustment mechanism 7 is provided to an end piece member 8 that is attached to the rear end of the arm portion 1a. The end piece member 8 is manufactured from a suitable rigid member, such as light alloy by using suitable methods, e.g., casting.

Figure 2:
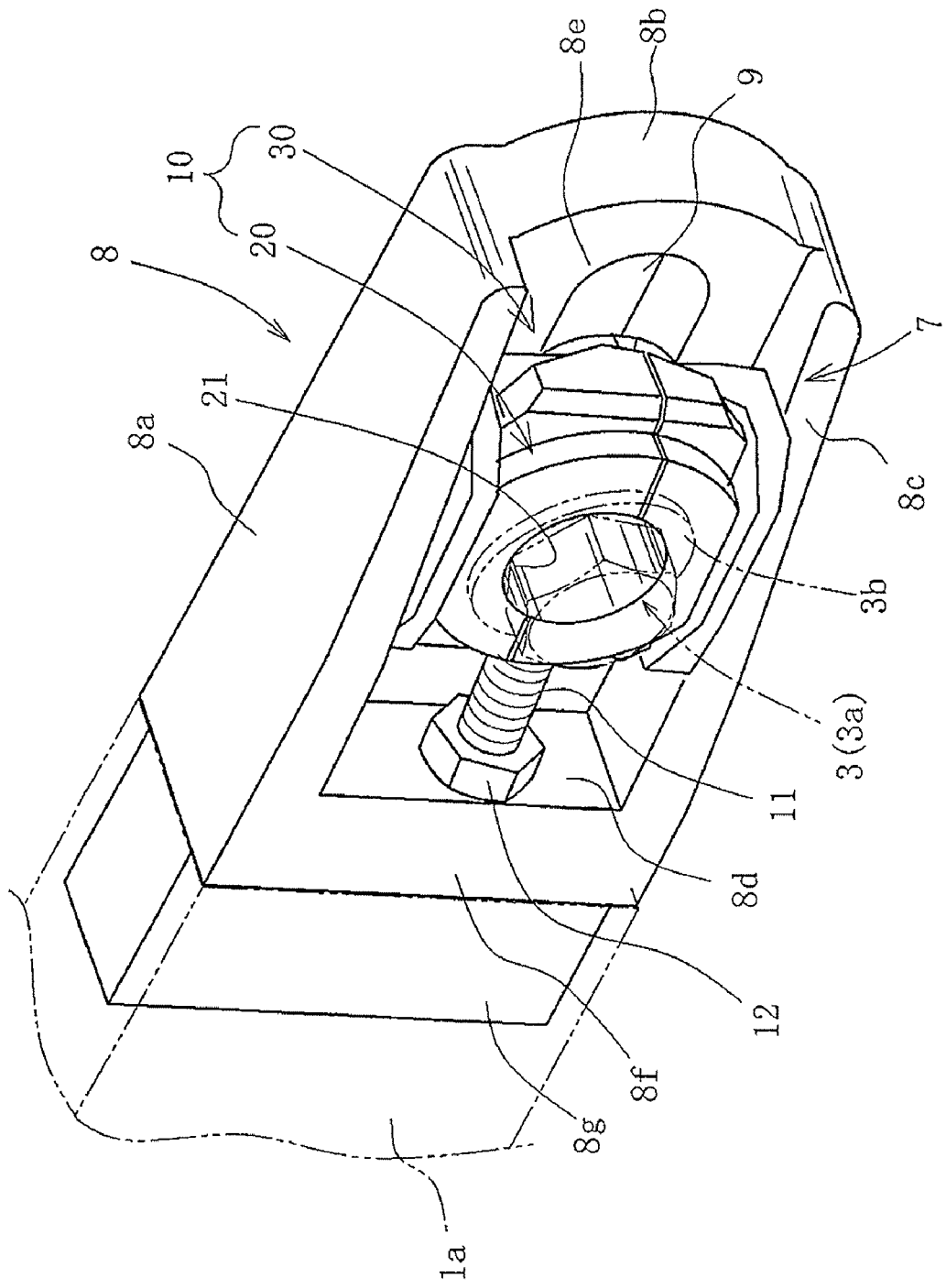
FIG. 2 is an enlarged perspective view of the rear end portion of a rear fork.

FIG. 2 is a perspective view of the rear end portion of the rear fork, showing the chain adjustment mechanism as viewed from outside and obliquely rear with respect to the width direction of the vehicle body.

The end piece member 8 includes an upper face wall 8a, a side face wall 8b, a lower face wall 8c, and a front wall 8d. The upper face wall 8a, the lower face wall 8c, and the front wall 8d project laterally from the side face wall 8b, forming an adjustment recess 8e (see FIG. 6) surrounded by these wall portions.

Figure 6:
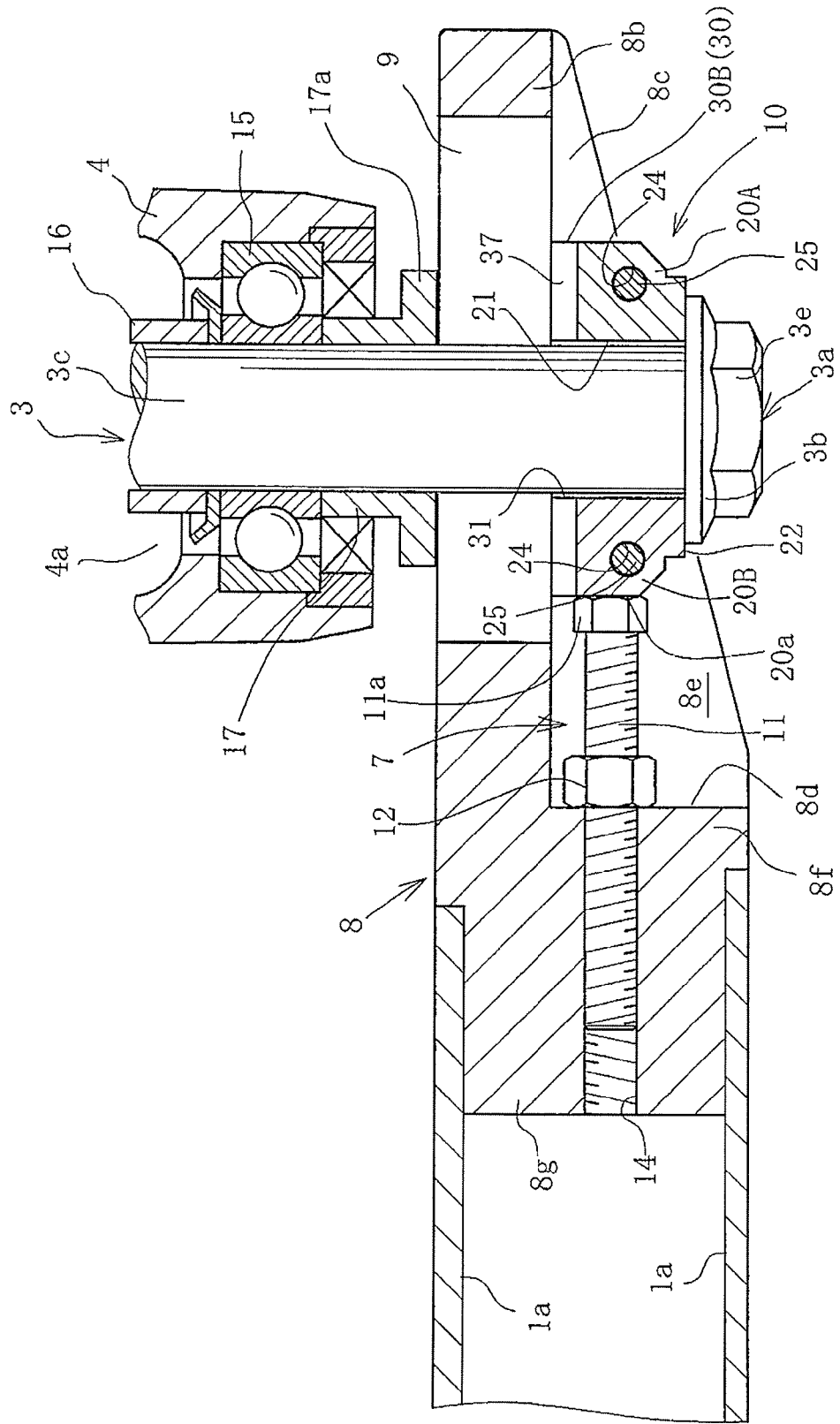
FIG. 6 is a cross-sectional view along the line 6-6 of FIG. 5.
Figure 7:
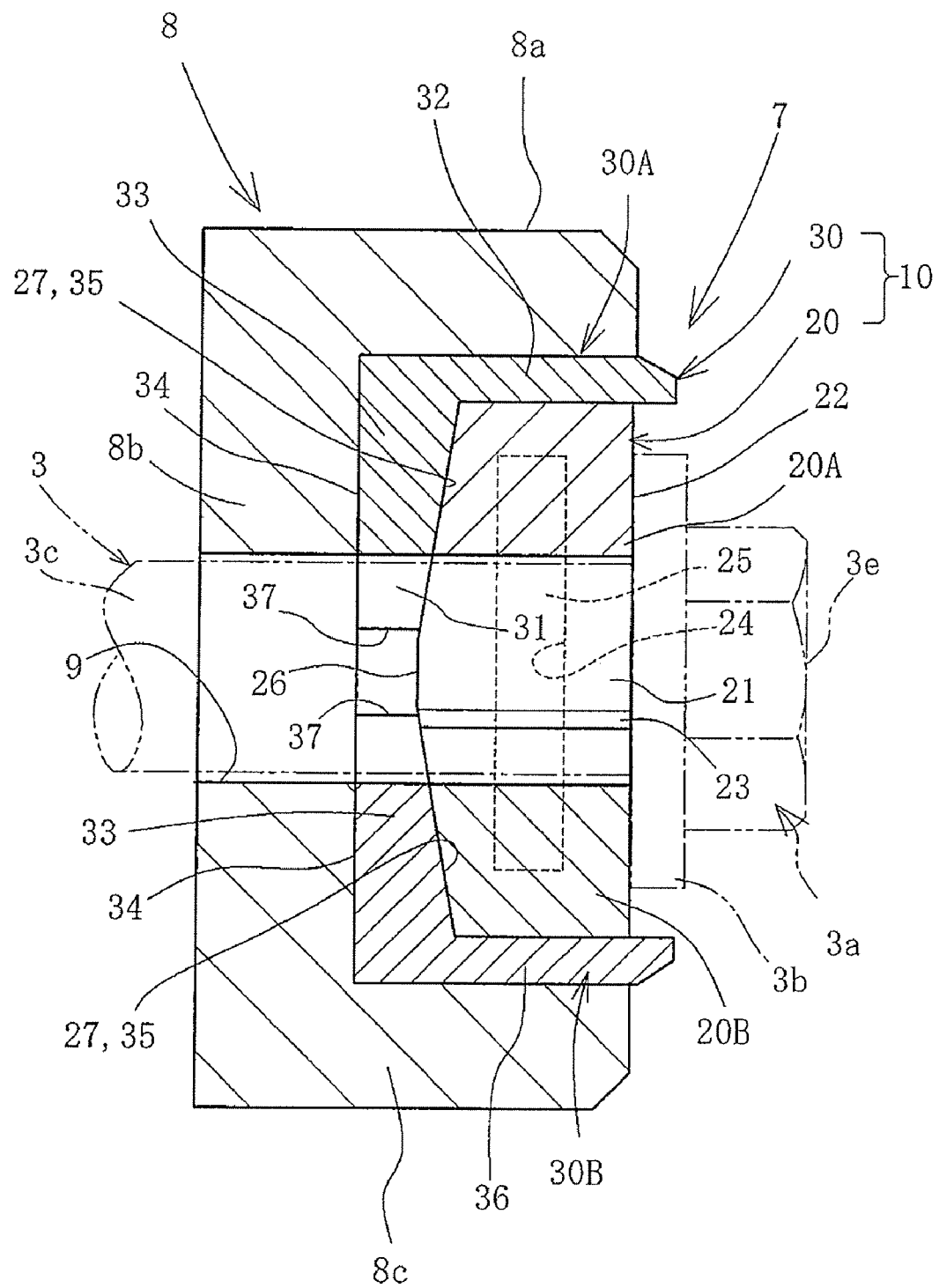
FIG. 7 is a cross-sectional view along the line 7-7 of FIG. 5.

The upper face wall 8a, the side face wall 8b, and the lower face wall 8c have a substantially C-shape in vertical cross-section (see FIG. 7). The side face wall 8b and the front wall 8d have a substantially L-shape in longitudinal cross-section (see FIG. 6). Therefore, the adjustment recess 8e is closed at the front and on the inside, and is open laterally outwards and to the rear.

The front wall 8d is the back portion, facing the adjustment recess 8e, of a base portion 8f that is connected to the rear end of the arm portion 1a. The dimensions of the base portion 8f are such that its vertical width and lateral width are substantially the same as the rear end of the arm portion 1a. A fitting projection 8g integrally projects forwardly from the base portion 8f. The fitting projection 8g is one size smaller than the vertical width and lateral width of the base portion 8f, and fits into the opening (see FIG. 4) at the rear end of the arm portion 1a.

When the rear end face of the arm portion 1a is abutted against the stepped portion between the fitting projection 8g and the base portion 8f, and the rear end face of the arm portion 1a and the stepped are coupled together using a suitable, e.g., welding, the base portion 8f of the end piece member 8 is attached to and integrated with the rear end of the arm portion 1a.

An elongated opening 9 is formed in the side face wall 8b. The elongated opening 9 is elongated in the longitudinal direction. An adjustment member 10 is fitted in the adjustment recess 8e. The adjustment member 10 is free to move within the adjustment recess 8e along the direction of the length of the elongated opening 9 while being guided by the upper face wall 8a and the lower face wall 8c, and its forward position is adjusted by using an adjustment bolt 11.

The chain adjustment mechanism 7 includes the adjustment bolt 11 together with the adjustment member 10. The adjustment bolt is locked in position by a lock nut 12 in a state with its amount of advance or retraction adjusted.

The adjustment member 10 includes a projecting member 20 and a recessed member 30. The projecting member 20 and the recessed member 30 include shaft holes 21 formed therein (in FIG. 2, only a shaft hole 21 formed in the projecting member 20 side is shown, and a shaft hole 21 on the recessed member 30 side is not shown). The shaft holes 21 are aligned with the elongated opening 9, and the rear wheel axle 3 is passed through the shaft holes 21 and the elongated opening 9.

A flange 3b provided at a head portion 3a of the rear wheel axle 3 is brought into close contact with a seating face 22 of the projecting member 20. The seating face 22 is formed as a flat surface around the shaft hole 21 in the outer side face the projecting member 20. The rear wheel axle 3 has a long bolt-like shape. A shaft portion 3c includes a threaded portion formed at a distal end portion 3d thereof, and a hexagonal portion 3e formed at the head portion thereof.

Figure 3:
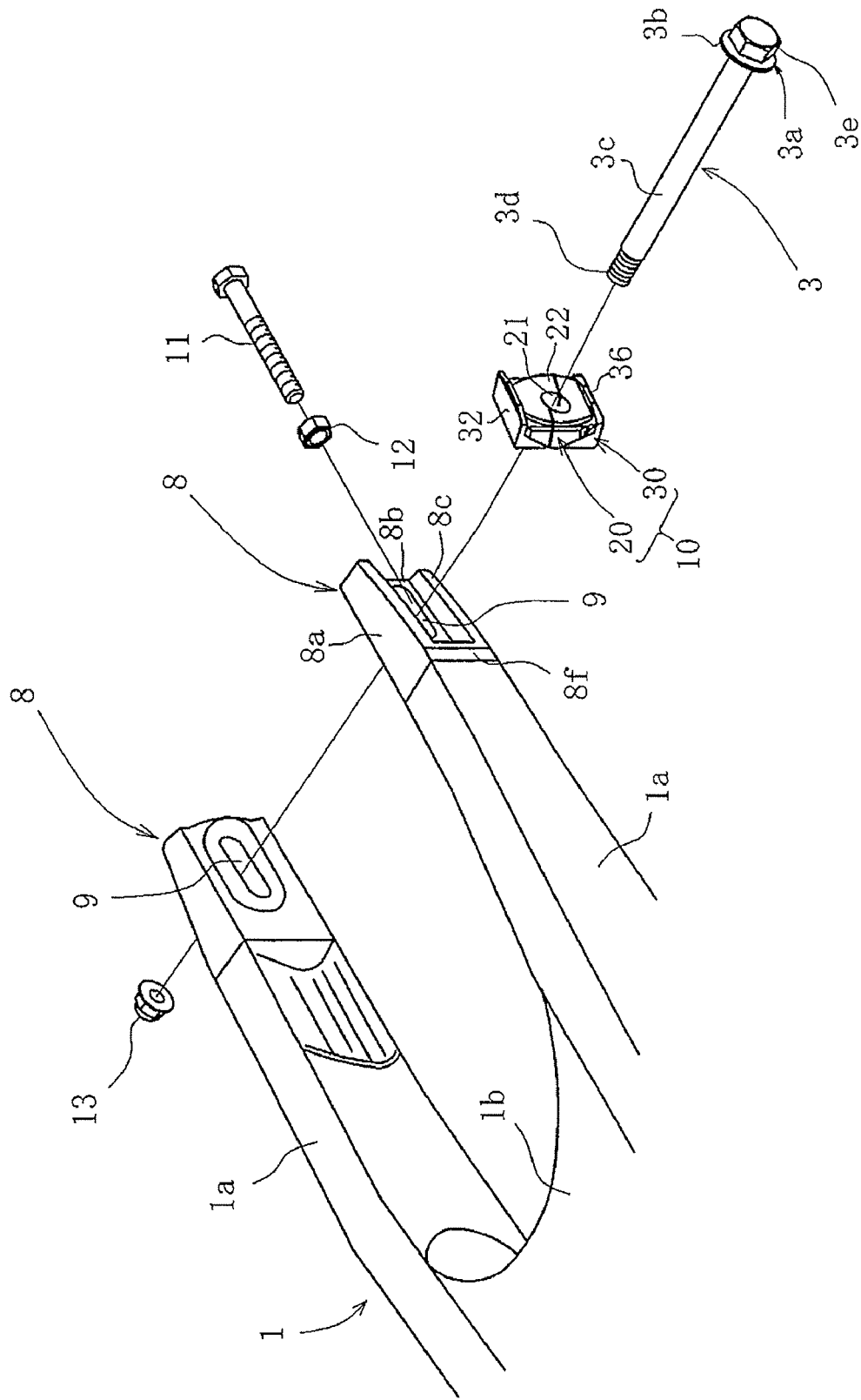
FIG. 3 is an exploded view of a chain adjustment mechanism to a rear fork.

FIG. 3 is an exploded view showing mounting of the chain adjustment mechanism 7 on the rear end portion of the rear fork 1. The end piece members 8 are attached to the rear end portion of each respective one of the left and right arm portions 1a. The adjustment member 10 is fitted in each of the adjustment recesses 8e. Prior to the fitting of the adjustment member 10, the adjustment bolt 11 and the lock nut 12 are attached to the base portion 8f side from the rear. Although not apparent from FIG. 3, the left and right end piece members 8 are attached in opposite directions so that respective adjustment recesses 8e face the outwardly. The adjustment member 10 is also arranged in such that the seating face 22 of the projecting member 20 faces the outwardly.

The rear wheel 2 is placed between the left and right arm portions 1a. The shaft portion 3c of the rear wheel axle 3 is formed as a long bolt. The shaft portion 3c is inserted into the shaft hole, the elongated opening 9 in the end piece member 8, and the adjustment member 10 on one side (a left side in FIG. 3) so as to extend through the axle hole formed in the hub of the rear wheel in the lateral direction. The shaft portion 3c is made to extend through the elongated opening 9 and the shaft hole in the end piece member 8 and the adjustment member on the other side (the right side in this example). An axle nut 13 is fastened to the threaded portion 3d projecting on the other side.

Thus, the rear wheel axle 3 is supported in position between the left and right arm portions 1a, and its position in the longitudinal direction is fixed.

Figure 4:
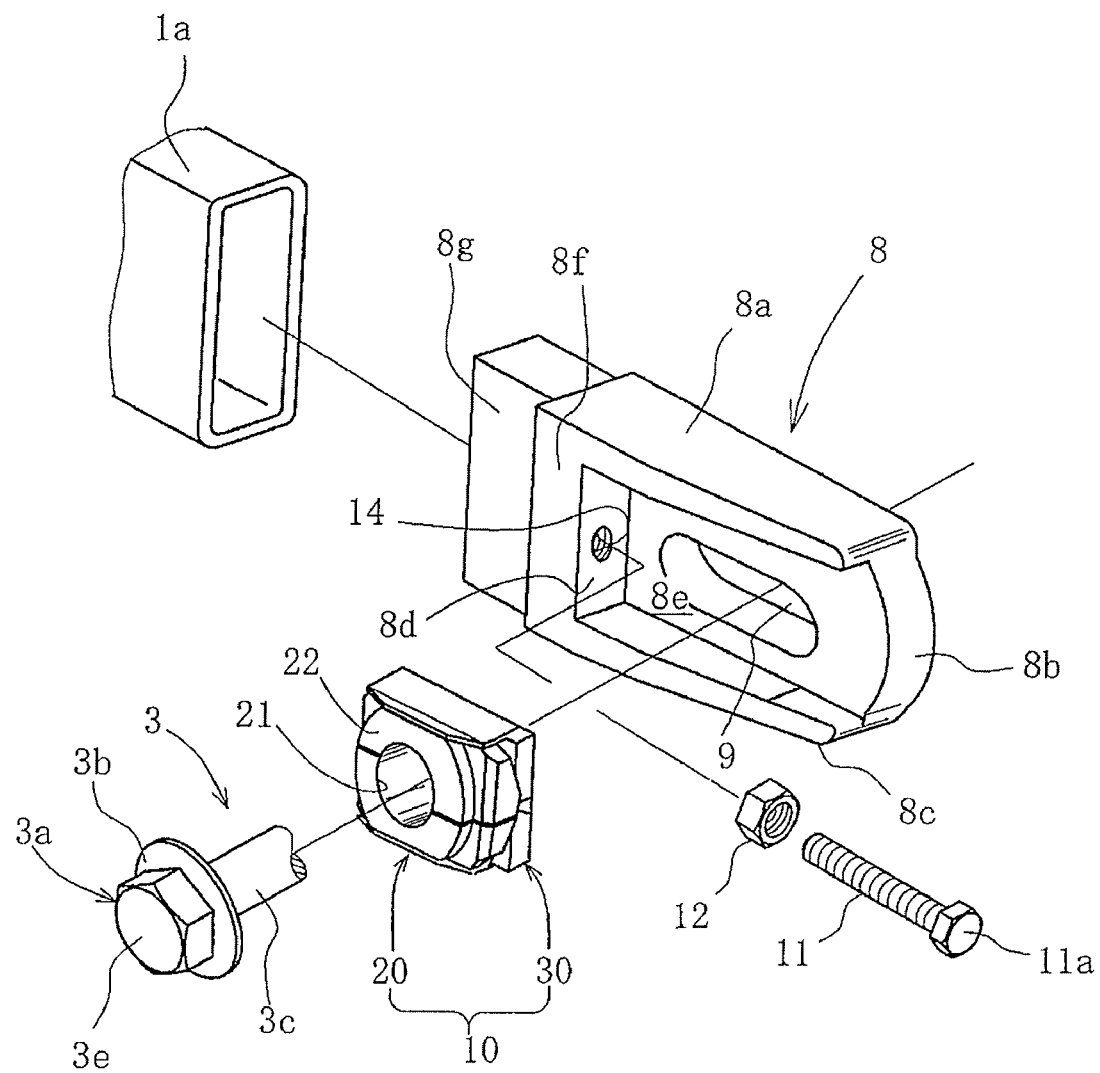
FIG. 4 is an enlarged exploded view of a chain adjustment mechanism.

FIG. 4 is a detailed exploded view of the chain adjustment mechanism in the arm portion 1a on one side (a left side in this example) shown in FIG. 2.

The adjustment member 10 is operable to move within the adjustment recess 8e in the longitudinal direction integrally with the rear wheel axle 3. The rear wheel axle 3 that extends through the adjustment member 10 is operable to move in the longitudinal direction together with the adjustment member 10 while being guided by the elongated opening 9 that is formed so as to be elongated in the longitudinal direction in the side face wall 8b of the end piece member 8.

The thickness in the vertical direction of each of the upper face wall 8a and lower face wall 8c of the end piece member 8 is set in such that a sufficient rigidity is provided for bearing the fastening force of the adjustment member 10 (recessed member 30). The height of projection to the lateral side is set so as to allow sliding contact with the upper and lower faces of the adjustment member 10 for guiding the adjustment member 10.

Although the side face wall 8b is formed relatively thick so as to provide sufficient rigidity for bearing the load applied to the rear wheel axle 3, the side face wall 8b is thinner than that disclosed in the art (e.g., the Japanese Patent Document JP-A No. S63-48691). It may be noted that the inner side wall at the rear end portion of the arm portion 1a may be freely extended rearwardly so as to be overlapped on the inner side of the side face wall 8b, or may be freely reinforced by overlapping a separate reinforcing plate.

A female threaded hole 14 is provided in the front wall 8d. The female threaded hole 14 faces the adjustment recess 8e at one end and extends forwardly through (along the thicknesses direction) the base portion 8f and fitting protrusion 8g at the other end. The female threaded hole 14 receives and provides fastening for the adjustment bolt 11 in such that advancement or retraction of the adjustment bolt 11 is freely adjusted.

The width in a vertical direction of the elongated opening 9 is only slightly larger than the outer diameter of the shaft portion 3c of the rear wheel axle 3. A length of the elongated opening 9, in a longitudinal direction, is several times a dimension (width) thereof in the vertical direction. The length of the elongated opening 9 is set in accordance with the maximum adjustment amount of the chain, that is, the maximum expected amount of slack to be adjusted.

Figure 5:
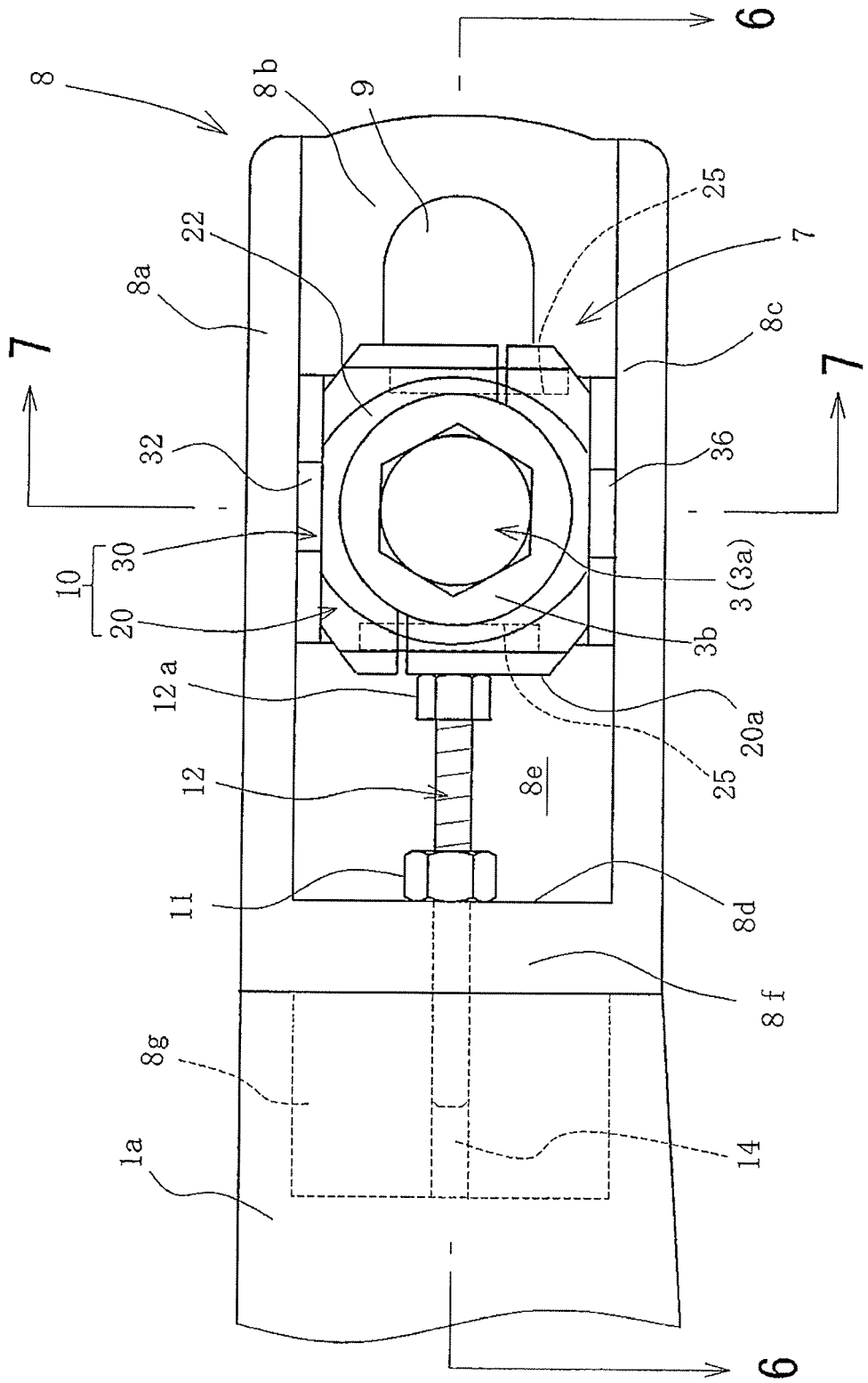
FIG. 5 is a side view of a chain adjustment mechanism.

FIG. 5 is a side view of the chain adjustment mechanism shown in FIG. 2, FIG. 6 is a cross-sectional view along the line 6-6 of FIG. 5, and FIG. 7 is a cross-sectional view along the line 7-7 of FIG. 5.

As shown in FIGS. 5-7, the adjustment member 10 is fitted in the adjustment recess 8e, which is elongated in the longitudinal direction. The adjustment member 10 is operable to adjust position thereof in a longitudinal direction on the side face wall 8b in which the elongated opening 9 is formed. Shaft holes 21 and 31 overlapping a part of the elongated opening 9 are provided at the respective center portions of the projecting member 20 and the recessed member 30. The shaft portion 3c of the rear wheel axle 3 is passed through the shaft holes 21, 31. The head portion 3a of the rear wheel axle 3 and the flange 3b forming a part of the head portion 3a overlaps and makes intimate contact with the seating face 22 of the projecting member 20, thereby applying the axial force to the entire projecting member 20 from the seating face 22 at the time of fastening.

As shown in FIG. 6, the end piece member 8 is formed in a substantially L-shape by the base portion 8f and the side face wall 8b in the longitudinal cross-section. As shown in FIG. 7, the end piece member 8 is and is formed in a substantially C-shape by the upper face wall 8a, the side face wall 8b, and the lower face wall 8c in the vertical cross-section in FIG. 7. The space of the recess formed by this substantially C-shaped portion serves as the adjustment recess 8e (FIG. 6). The recessed member 30 constituting a part of the adjustment member 10 which is fitted in the adjustment recess 8e has a substantially C-shaped cross section with a recess formed at the outer lateral side as shown in FIG. 7. The projecting member 20 is fitted in the recess of the recessed member 30.

The inner side face of the projecting member 20 forms a substantially V-shaped projecting slope 27 whose vertically intermediate portion projects toward the inner side. A recessed slope 35 of the recessed member 30 forms a substantially V-shaped recessed slope that goes into the inner side toward the vertically intermediate portion. The projecting member 20 and the recessed member 30 are overlapped along the substantially V-shaped projecting slope 27 and the substantially V-shaped recessed slope 35 into wedged engagement with each other.

As shown in FIG. 6, the hub of the rear wheel 4 includes an axle hole 4a, a bearing 15, and collars 16 and 17. A flange 17a of the color 17 is abutted and supported on the inner face of the end piece member 8, and its size is determined by the coupling rigidity required by the rear wheel axle 3.

The adjustment bolt 11 is screwed into the female threaded hole 14 which is opened and formed in the front wall 8d so as to extend through the solid base portion 8f and fitting projection 8g in the longitudinal direction. The rearward projecting length from the front wall 8d can be freely adjusted by adjusting the amount of screwing, and such adjusted state can be locked and maintained by fastening the lock nut 12.

A head portion 11a of the adjustment bolt 11 abuts on a front face wall 20a of the projecting member 20, thereby effecting (e.g., restricting) a forward positioning thereof.

When adjusting the position of the rear wheel axle 3 to adjust the tension of the chain, the nut 13 fastened to the rear wheel axle 3 is loosened. Thus, the axial force due to the head portion 3a and flange 3b of the rear wheel axle 3 applied to the projecting member 20 relieved, so the pressure contact force between an inner side face 34 of the recessed member 30 and the side face wall 8b of the end piece member, between an upper wall 31 and the upper face wall 8a, and between a lower wall 36 and the lower face wall 8c relieved, thus allowing the adjustment member 10 to move within the adjustment recess 8e.

Accordingly, when the adjustment member 10 is retracted in a direction toward the front of the vehicle body together with the rear wheel axle 3, the rear wheel axle 3 moves in the longitudinal direction of the vehicle body while being guided by the elongated opening 9. Thus, the center distance between the output shaft (not shown) of the engine and the rear wheel axle 3 changes, and the driving sprocket (not shown) attached to the output shaft and the driven sprocket 5 (FIG. 1) attached to the hub 4 of the rear wheel 2 changes in position.

This makes it possible to eliminate the slack in the chain 6 wound around the driving sprocket and the driven sprocket 5 to adjust the tension of the chain 6 to a tension suitable for transmission of power, and adjust the efficiency of power transmission by the chain 6 in an optimum manner by advancing or retracting the adjustment member 10.

Positioning of the adjusted adjustment member 10 is effected by the adjustment bolt 11. That is, the lock nut 12 is loosened, the adjustment bolt 11 screwed in the female threaded hole 14 of the front wall 8d is rotated in the forward or reverse direction to adjust the amount of advance or retraction of the adjustment bolt 11, the head portion 11a of the adjustment bolt 11 is abutted on the front portion of the adjustment member 10 in the optimal position, and the lock nut 12 is fastened in this state, thereby effecting accurate positioning of the adjustment member 10 in an adjusted position.

Although no positioning on the rear side is provided in this embodiment since the adjustment member 10 is pulled forwards by the chain 6 at all times, such positioning may be provided.

Figure 8:
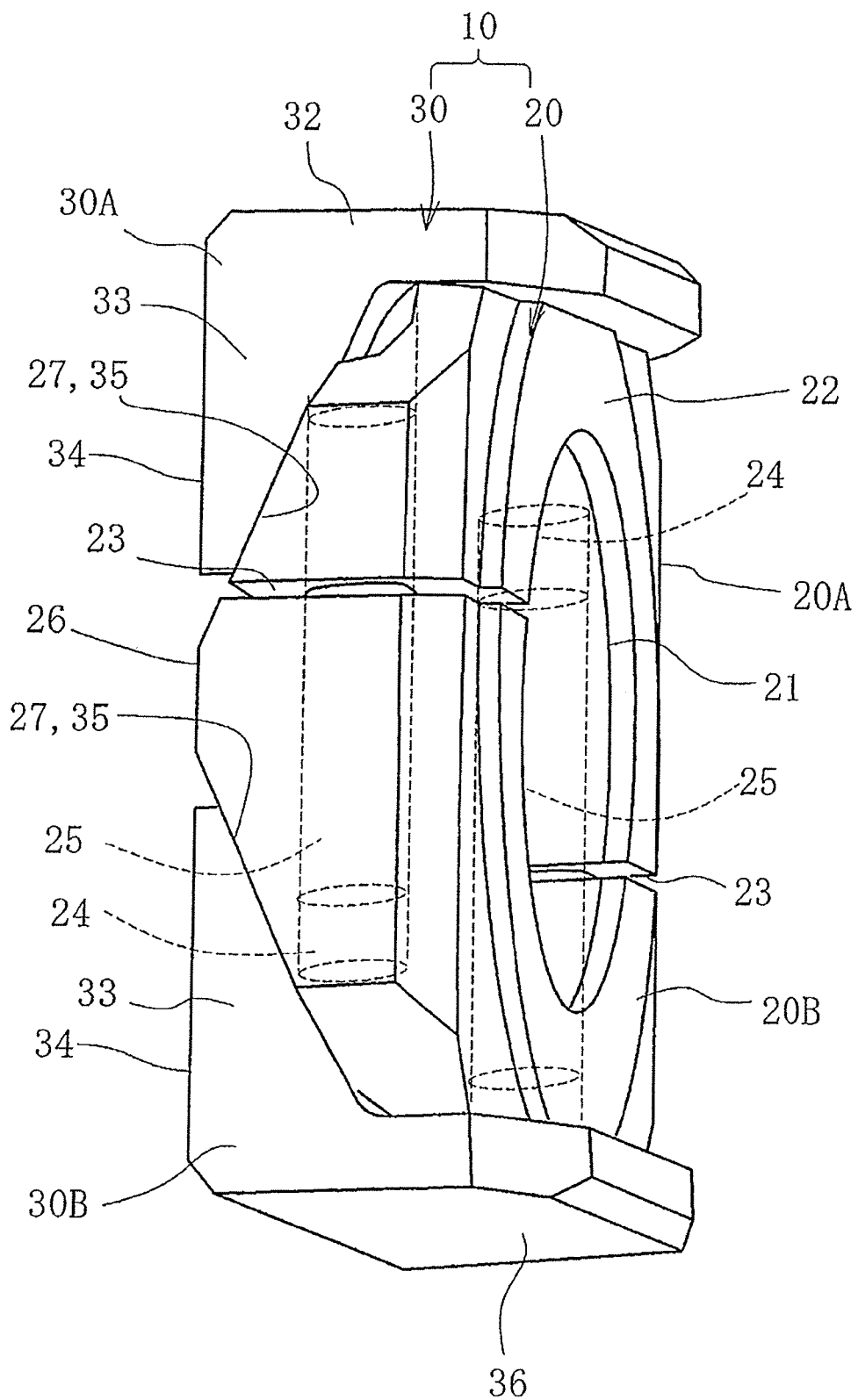
FIG. 8 is a perspective view showing an assembled state of an adjustment member.
Figure 9:
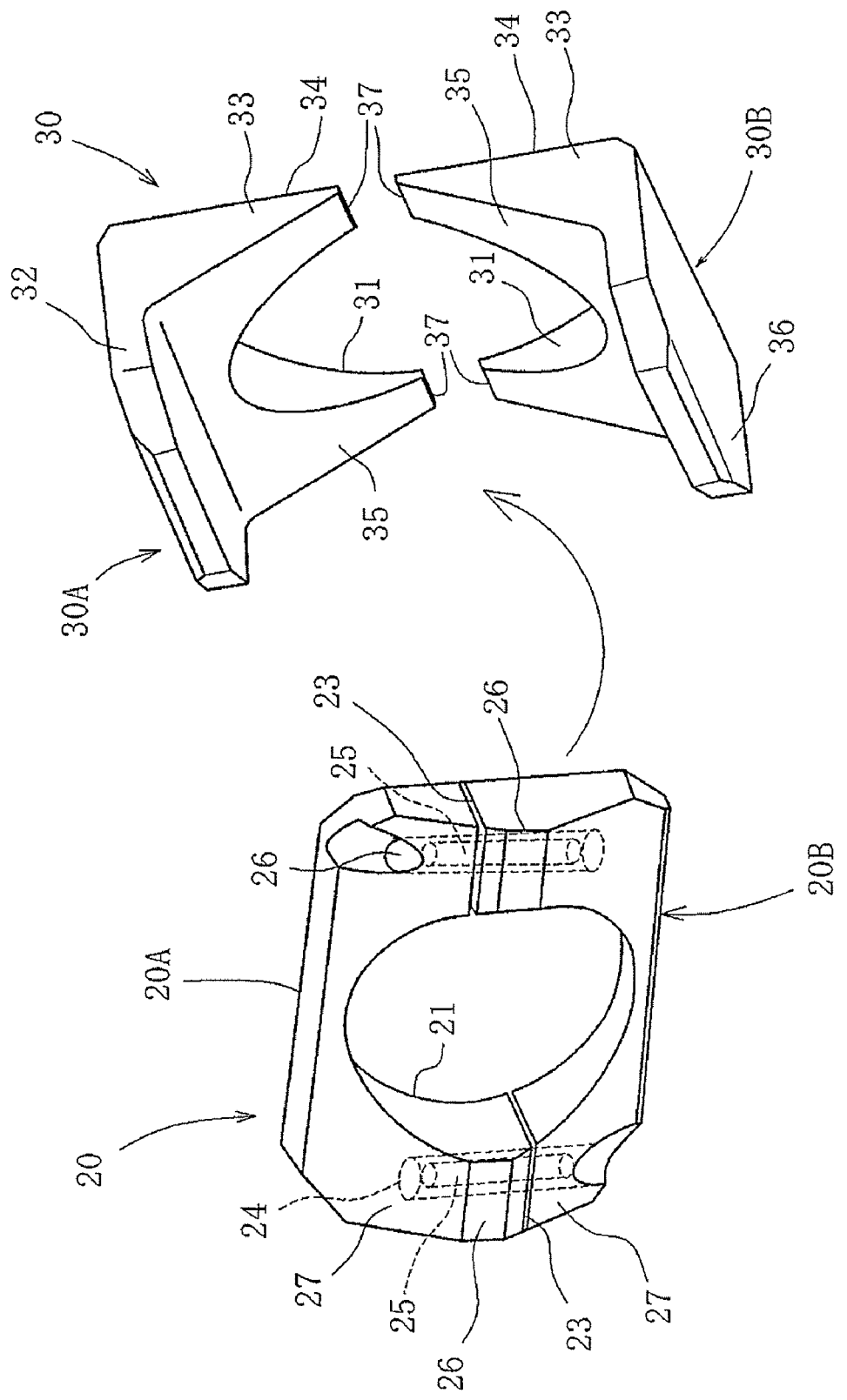
FIG. 9 is an exploded view of an adjustment member.

FIG. 8 is an enlarged perspective view of the adjustment member 10 showing how the projecting member 20 and the recessed member 30 are combined with each other. FIG. 9 is a split view of the adjustment member 10, in which the projecting member 20 is inverted to show inner side thereof that overlaps the recessed member 30. The projecting member 20 and the recessed member 30 are each formed from a suitable member such as resin or light alloy. Use of resin or light alloy makes it possible to reduce the weight of the adjustment member 10 as a whole.

As shown in FIG. 9, the projecting member 20 has at its axial center portion the shaft hole 21 through which the rear wheel axle 3 extends, has splitting faces 23 on the left and right with the shaft hole 21 therebetween, and is split vertically in two into split bodies 20A and 20B. In each of the split body 20A and the other split body 20B of the projecting member 20, a guide hole 24 and a guide pin 25 for allowing relative movement of these split bodies in the vertical direction are provided in staggered positions.

However, when each of the seating face on the side of the head portion 3a of the rear wheel axle 3 (in this embodiment, the surface where the flange 3b contacts the projecting member 20) and the seating face 22 of the projecting member 20 is sufficiently large, it is not always necessary to provide the guide pin 25, and this can be omitted.

It may be noted that the positions of the splitting faces 23 and the guide hole 24 (described later) are so determined as to allow the same split body to be mounted in a vertically inverted orientation as the upper and lower split bodies 20A and 20B.

In the outer side face of the projecting member 20, there is provided the seating face 22 on which the head portion 3a and flange 3b of the rear wheel axle 3 are seated. The inner side face is substantially V-shaped, with vertically intermediate portion thereof being an apex portion 26 where the inner side face projects most to the inner side, and the projecting slope 27 that slopes toward the apex portion 26 is formed. For the split bodies 20A and 20B as a whole, the projecting slope 27 forms a substantially V-shaped projecting slope that projects toward the inner side with the apex portion 26 as the apex, and abuts on the substantially V-shaped recessed slope of the recessed member 30 (described later).

The apex portion 26 forms a flat surface. The splitting faces 23 between the split bodies 20A and 20B are formed at positions vertically offset from the apex portion 26 with the shaft hole 21 therebetween in the longitudinal direction, that is, at the boundary between the apex portion 26 and the projecting slope 27.

One of the splitting faces 23 is located above the apex portion 26, and the other is located below the apex portion 26, thereby ensuring stable abutment. It may be noted that when each of the seating face on the side of the head portion 3a of the rear wheel axle 3 (in this embodiment, the surface where the flange 3b contacts the projecting member 20) and the seating face 22 of the projecting member 20 is sufficiently large, it is not always necessary to offset the splitting faces 23 between the split bodies 20A and 20B.

The splitting bodies 20A and 20B can freely approach or separate from each other in the approaching direction or separating direction while being guided by the guide pin 25. As the split bodies 20A and 20B approach and separate from each other, the distance between the splitting faces 23 changes, and the diameter of the shaft hole 21 in the vertical direction changes. This diameter is set such that at a smallest possible value thereof, the diameter is substantially equal to or slightly smaller than the outer diameter of the shaft portion 3c.

Therefore, as the upper and lower split bodies 20A and 20B approach each other so as to narrow the width between the opposing splitting faces 23, the inner circumferential face of the shaft hole 21 is brought into intimate contact with the outer circumferential face of the shaft portion 3c.

The recessed member 30 is formed in a substantially C-shape in vertical cross-section (see FIG. 7). The shaft hole 31 through which the rear wheel axle 3 extends is provided at the central portion of the recessed member 30, which is split at the center of the shaft hole 31 into an upper split body 30A and a lower split body 30B in a vertically symmetrical manner.

The upper split body 30A integrally includes an upper wall 32 whose upper end portion hangs over outwards in the vehicle width direction, and the side face wall 33 that hands over downwards. The upper face of the upper wall 32 is parallel to the lower face of the upper face wall 8a of the end piece member 8, and abuts on the lower face of the upper face wall 8a when the upper split body 30A moves most upwards.

The lower end of the side face wall 33 forms a split face 37. An inner side face 34 is parallel to the side face wall 8b of the end piece member 8 and slides on the side face wall 8b. The outer side face of the side face wall 33 forms the recessed slope 35, which slopes so as to become thinner toward the split face 37. This slope conforms to the slope of the projecting slope 27.

The lower split body 30B integrally includes a lower wall 36 whose lower end portion hangs over outwards in the vehicle width direction, and the side face wall 33 that hands over upwards. Since the lower split body 30B is equivalent to the upper split body 30A inverted in the vertical direction, the same reference sign as that used for the upper split body 30A is commonly used with respect to the side face wall 33.

The lower face of the lower wall 36 is parallel to the upper face of the lower wall 8c of the end piece member 8, and abuts on the upper face of the upper face wall 8a when the lower split body 30B moves downwards. The side face wall 33 is the same as that of the upper split body 30A, and has the inner side face 34 that is parallel to the side face wall 8b of the end piece member 8 and slides on the side face wall 8b, and the recessed slope 35 that slopes so as to become gradually thinner toward the split face 37 at the center.

As shown in FIG. 8, with the respective split faces 37 of the upper split body 30A and lower split body 30B opposed to each other, their respective recessed slopes 35 form a substantially V-shaped recessed slope as a whole, and the projecting slope 27 of the projecting member 20 having a projecting shape as a whole rides on this recessed slope.

When the projecting member 20 is pushed into the recessed member 30, due to the wedged engagement between the recessed slope 35 and the projecting slope 27, the upper split body 30A and the lower split body 30B are spread apart so as to separate from each other and move in the vertical direction.

As shown in FIG. 7 (showing mounted state of the adjustment member 10, described above), by fastening the rear wheel axle 3, the resulting axial force causes the projecting member 20 to be pushed into the recessed member 30, the upper split body 30A is moved upwards to bring the upper wall 32 into abutment against the upper face wall 8a, and the lower split body 30B is moved downwards to bring the lower wall 36 into abutment against the lower face wall 8c, thereby achieving a fixed state. Thus, the axial force on the rear wheel axle 3 can be transmitted to the upper wall 32 and the lower wall 36, and these walls can be firmly pressed onto the upper face wall 8a and the lower face wall 8c by means of surface contact for frictional engagement.

Moreover, by loosening the rear wheel axle 3, the coupling between the upper split body 30A and the lower split body 30B, and the upper face wall 8a and the lower face wall 8c is released, allowing sliding movement in the same manner as in the related art. It may be noted that in this fixed state, the respective split faces 37 of the upper split body 30A and lower split body 30B face each other at a distance from each other, with the apex portion 26 inserted therebetween. Even in such state, the apex portion 26 keeps a distance from the side face wall 8b without contacting the side face wall 8b.

In addition, the projecting member 20 is split vertically in two into the split bodies 20A and 20B, which are free to approach and separate (i.e., adjustable to maintain a distance therebetween) from each other by using the guide pin 25. Thus, the projecting member 20 causes the upper split body 30A and the lower split body 30B to move upwards and downwards by wedged engagement. At the same time, by the reaction forces from the upper split body 30A and the lower split body 30B, the inner circumferential face of the shaft hole 21 in each of the split bodies 20A and 20B is brought into pressure contact with the periphery of the shaft portion 3c of the rear wheel axle 3. The projecting member 20 and the rear wheel axle 3 are thus integrated with each other, thereby transmitting the axial force on the rear wheel axle 3 to the projecting member 20.

Next, operation of the illustrative embodiment is described below.

When the projecting member 20 and the recessed member 30 are combined together, as shown in FIG. 8, the rear wheel axle 3 is passed through the shaft holes 21 and 31, and the nut 13 (FIG. 3) is fastened to the threaded portion 3*d* at the distal end of the rear wheel axle 3, and by an axial force corresponding to the fastening force on the rear wheel axle 3, the head portion 3*a* of the rear wheel axle 3 including the flange portion 3*b* is brought into close contact with the seating surface 22 of the projecting member 20 and presses this inwards in the axial direction.

Thus, the projecting slope 27 of the projecting member 20 slides on the recessed slope 35 of the recessed member 30 which is in wedged engagement with the projecting slope 27, and the apex portion 26 bites and goes in between the respective split faces 37 of the upper split body 30A and lower split body 30B so as to spread them apart. At the same time, a wedging action that applies an upward or downward force to the respective recessed slopes 35 of the upper split body 30A and lower split body 30B is produced, and due to this wedging action, the upper split body 30A and the lower split body 30B are moved upwards and downwards, respectively.

Accordingly, the upper wall 32 of the upper split body 30A is abutted against the lower face of the upper face wall 8*a* of the end piece member 8 into surface contact, and the lower wall 36 of the lower split body 30B is abutted against the upper face of the lower face wall 8*c* of the end piece member 8 into surface contact.

As a result, the upper wall 32 of the upper split body 30A and the upper face wall 8*a*, and the lower face wall 36 of the lower split body 30B and the lower face wall 8*c* are pressed against each other by means of surface contact, a large friction coupling force is generated in these surface contact portions. In addition, the inner side face 34 in the vehicle width direction of the recessed member 30 is brought into surface contact with the side face wall 8*b* of the end piece member 8 without leaving a gap.

Since the adjustment member 10 is firmly fastened to the end piece member 8 by of these surface contact portions, the rigidity of coupling of the adjustment member 10 with the end piece member 8 can be enhanced. Moreover, since all contacts take the form of surface contact, it is possible to suppress deformation of individual portions by fastening the rear wheel axle 3.

Therefore, it is also possible to achieve a reduction in the size and weight of the device, without increasing the thickness of the end piece member 8 or the adjustment member 10 more than necessary or providing more than necessary reinforcement using another reinforcing member in order to enhance rigidity at the support portion of the rear wheel axle 3.

The projecting member 20 is formed by the split bodies 20A and 20B obtained by vertically splitting the projecting member 20 in two, and the guide pin 25 is passed through the guide hole 24 provided in each of the split bodies 20A and 20B, thereby coupling the split bodies 20A and 20B together so as to freely approach and separate from each other.

Thus, by pushing the projecting member 20 in the axial direction by the axial force on the rear wheel axle 3, the upper and lower split bodies 20A and 20B are respectively moved in the approaching direction by the reaction forces of the upper split body 30A and the lower split body 30B, and the inner circumferential face of the shaft hole 21 is brought into pressure contact with the periphery of the shaft portion 3*c* of the rear wheel axle 3. Thus, the projecting member 20 and the rear wheel axle 3 are integrated together in the axial direction, thereby transmitting the axial force on the rear wheel axle 3 to the projecting member 20.

Therefore, while in the related art a gap exists between the shaft hole in the adjustment member and the shaft portion of the rear wheel axle and thus the axial force on the rear wheel axle is applied to the adjustment member only from the head portion, according to the present invention, the axial force is applied to the adjustment member 10 also from the coupling portion between the adjustment member 10 and the shaft portion 3*c* in addition to the head portion 3*a* including the flange 3*b*, thereby making it possible to enhance the rigidity of fastening. Moreover, the guide pin 25 regulates the fastening direction of the projecting member 20, thereby making it possible to prevent displacement or slanting of the projecting member 20.

The present invention is not limited to the first embodiment mentioned above, but various modifications and applications are possible within the principle of the invention. Several other illustrative embodiments are described below, in common reference signs are used to denote portions that are common to the above-mentioned embodiment.

Figure 10:
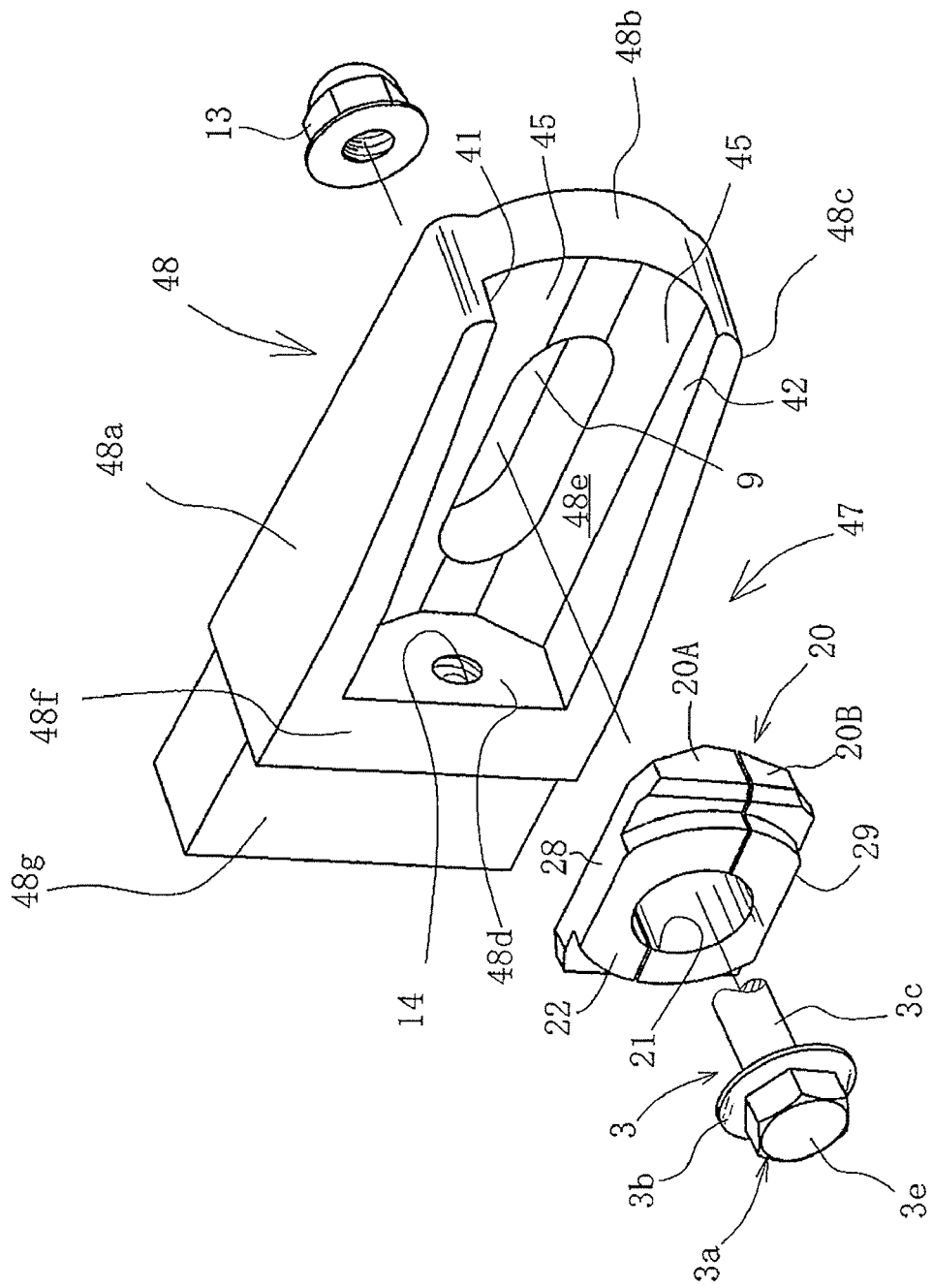
FIG. 10 is a view corresponding to FIG. 4, according to a second illustrative embodiment.
Figure 11:
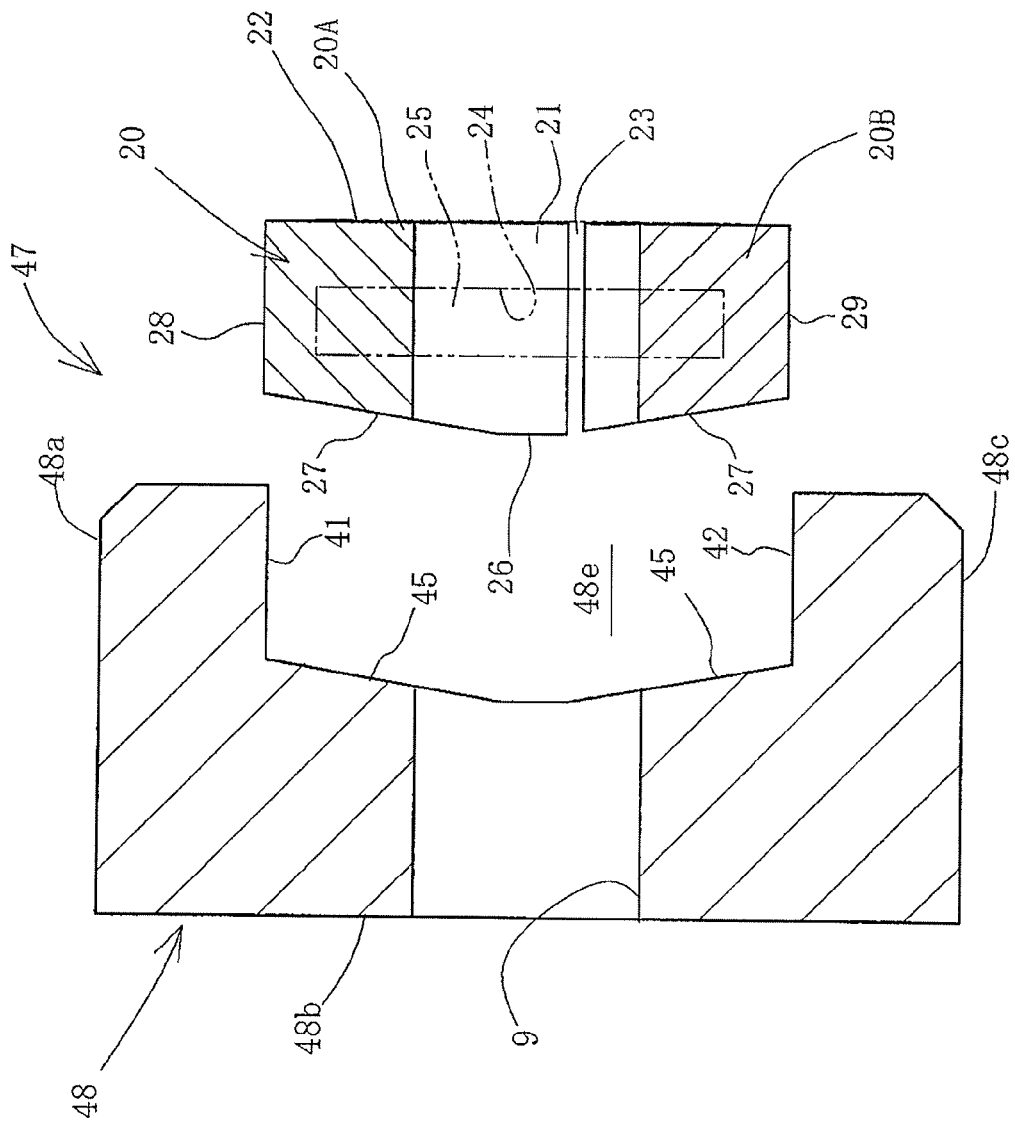
FIG. 11 is a cross-sectional assembly view of an adjustment member according to the second embodiment.
Figure 14:
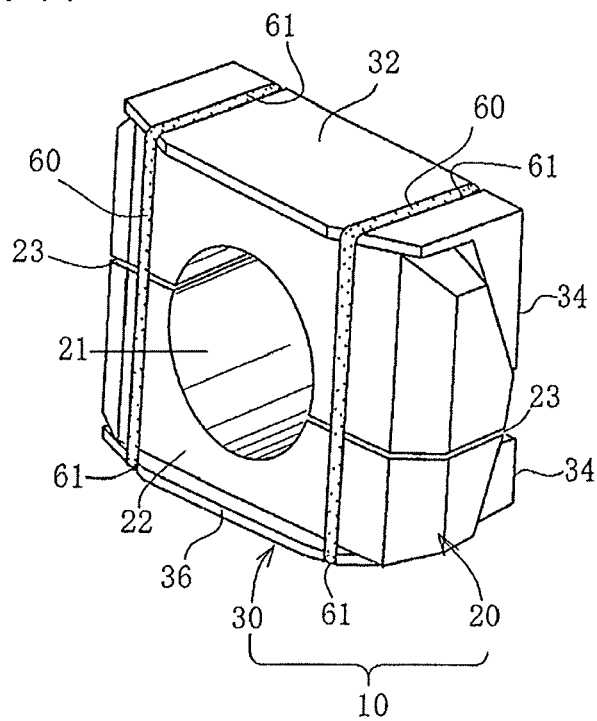
FIG. 14 is a perspective view of an adjustment member according to a fourth embodiment.

FIG. 10 is an exploded perspective view, corresponding to FIG. 14, showing the main portion of a chain adjustment mechanism 47 according to a second embodiment. FIG. 11 is an assembly view showing its components in vertical cross-section.

As shown in FIGS. 10-11, the chain adjustment mechanism 47 includes an end piece member 48 and the projecting member 20 as main components thereof. Other components of the chain adjustment mechanism 47 include the rear wheel axle 3 and the axle nut 13, and the adjustment bolt 11 and the lock nut 12 (not shown), which are the same as those in the discussed in the above-mentioned embodiment.

The adjustment member is formed solely by the projecting member 20, and the recessed member 30 according to the above-mentioned embodiment is integrated with the end piece member 48. The projecting member 20 is the same as that in the above-mentioned embodiment, and is vertically split. However, the projecting member 20 may be formed as a unitary member as a whole that is not split vertically in this way.

As in the illustrative embodiment, discussed above, the end piece member 48 is manufactured from a suitable rigid member such as light alloy by suitable means such as casting, and has a substantially C-shaped cross-section that is open laterally outwards in vertical cross-section (FIG. 11). In a side face wall 48*b* forming the bottom portion of an adjustment recess 48*e*, the elongated opening 9 is formed in the vertically intermediate portion so as to be elongated in the longitudinal direction.

The upper and lower portions across the elongated opening 9 are each formed as a recessed slope 45 that slopes so as to gradually go inwards toward the elongated opening 9. Thus, the outer side face of the side face wall 48*b* has a substantially V-shaped cross-section (FIG. 11). The projecting slope 27 of the projecting member 20 which is fitted in the adjustment recess 48*e* slides on the recessed slope 45. It should be noted that the adjustment recess 48*e* in this embodiment is formed directly in a portion of the outer side face of the end piece member 48 which includes the elongated opening 9.

The end piece member 48 only differs from the end piece member 8, discussed in the above-mentioned embodiment, with respect to the recessed slope 45. An upper face wall 48*a*, the side face wall 48*b*, a lower face wall 48*c*, a front wall 48*d*, the adjustment recess 48e, a base portion 48f, and a fitting projection 48g are the same as the upper face wall 8a, the side face wall 8b, the lower face wall 8c, the front wall 8d, the adjustment recess 8e, the base portion 8f, and the fitting projection 8g in the end piece member 8 according to the above-mentioned embodiment, respectively.

Accordingly, as shown in FIG. 10, when the projecting member 20 is fitted into the adjustment recess 48e, the rear wheel axle 3 is passed through the shaft hole 21 of the projecting member 20 and the elongated opening 9, and the axle nut 13 is fastened to the threaded portion at one end of the rear wheel axle 3 to thereby tighten the rear wheel axle 3, the axial force on the rear wheel axle 3 is transmitted from the head portion 3a to the adjustment member (projecting member 20), the projecting member 20 is pushed into the adjustment recess 48e, the projecting slope 27 of the projecting member 20 is pressed against and slides on the recessed slope 45, and the projecting member 20 bites into the side face wall 48b of the end piece member 48 for wedged engagement.

Thus, the adjustment member is firmly coupled to the end piece member to thereby enhance coupling rigidity. It is thus possible to enhance coupling rigidity without increasing the thickness of the end piece member or the adjustment member more than necessary or providing more than necessary reinforcement using another reinforcing member. In addition, a reduction in the size and weight of the device can be also expected.

Moreover, since the recessed member 30 according to the above-mentioned embodiment can be omitted by forming the adjustment member solely by the projecting member 20, it is possible to reduce the number of parts and also make effective use of the end piece member 48.

Furthermore, since the projecting member 20 is split vertically in two, the distance of mutual separation can be adjusted. When an upper face 28 of the upper slit body 20A is brought into contact with an inner face 41 of the upper face wall 48a and a lower face 29 of the lower split body 20B is brought into contact with an inner face 42 of the lower face wall 48c in advance, and then the rear wheel axle 3 is tightened, the projecting slope 27 of the projecting member 20 is brought into close contact with the recessed slope 45 in the side face wall 48b of the end piece member 48 and, at the same time, the upper face 28 and the lower face 29 are respectively brought into intimate contact with the upper face wall 48a and the lower face 48c.

Thus, as in the above-mentioned embodiment, the area of surface contact can be increased for enhanced coupling rigidity. However, even if the projecting member 20 is not split vertically in this way but is a unitary member, the above-mentioned effect, namely increasing the coupling rigidity by means of wedged coupling, can be attained.

Figure 12:
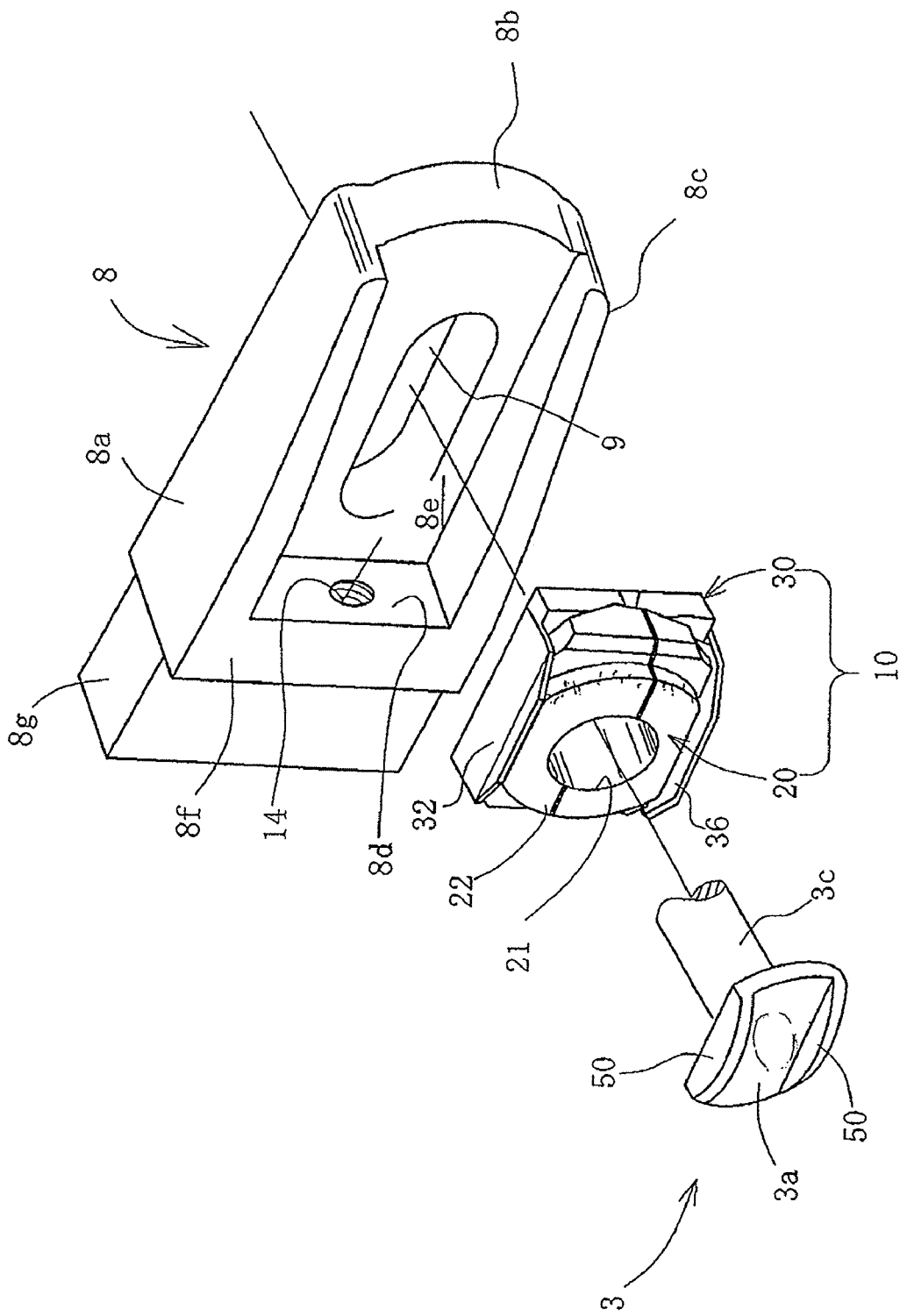
FIG. 12 is a view corresponding to FIG. 4, according to a third embodiment.
Figure 13:
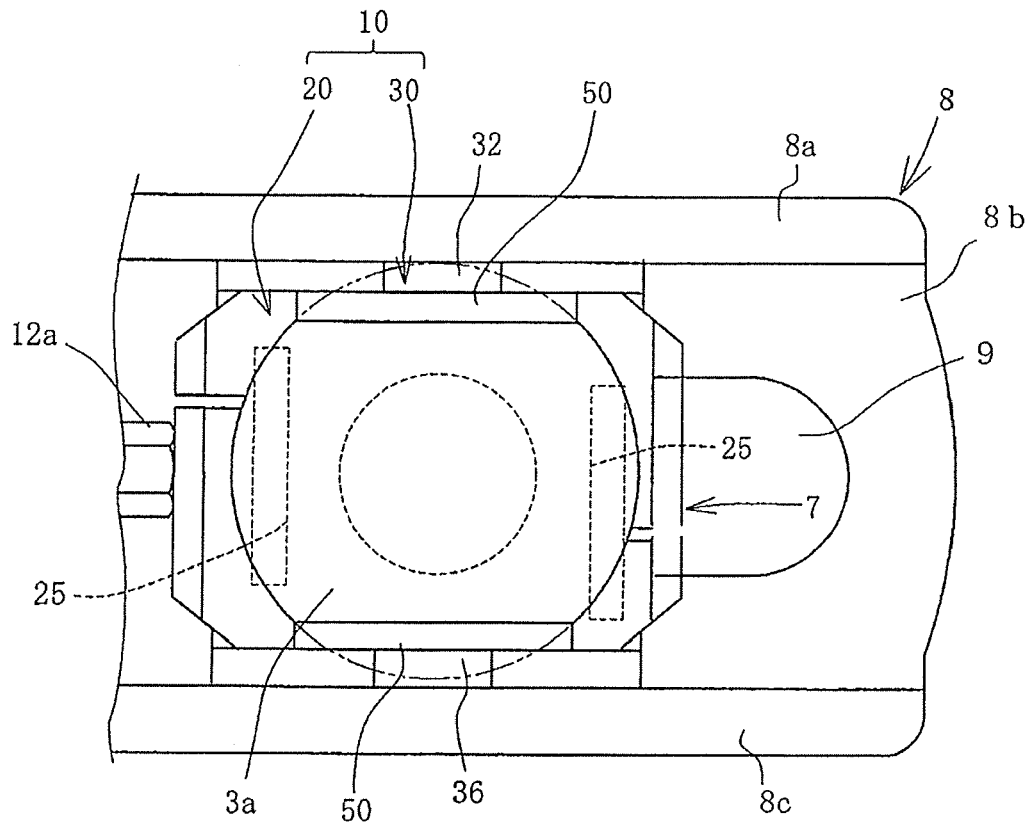
FIG. 13 is a view corresponding to FIG. 5, according to the third embodiment.

FIG. 12 is an exploded perspective view corresponding to FIG. 4, showing the main portion of the chain adjustment mechanism 7 according to a third embodiment. FIG. 13 is a view corresponding to FIG. 5, showing the chain adjustment mechanism 7 from the outer side in the axial direction of the rear wheel axle 3. The embodiment shown in FIGS. 12-13 differs from the first illustrative embodiment in the structure of the head portion 3a of the rear wheel axle 3 and is otherwise the same as the first embodiment.

In other words, a hexagonal portion is not formed in the head portion 3a, the head portion 3a as a whole has substantially the same thickness as the flange 3b, and its opposing portions are bent outwards substantially 90 degrees to form a pair of stopper portions 50.

The stopper portions 50 abut on the upper wall 32 and the lower wall 36, which are respectively formed in the upper split body 30A and lower split body 30B of the recessed member 30 and hang over outwards in the vehicle width direction, when the rear wheel axle 3 is passed through the shaft hole 21 of the projecting member 20, and the head portion 3a (the portion excluding the stopper portions 50) is overlapped on the seating face 22.

Accordingly, when the axle nut 13 is fastened to one end of the rear wheel axle 3 (see FIG. 10), the stopper portions 50 abut on the upper wall 32 and the lower wall 36, and further the upper wall 32 and the lower wall 36 are abutted on the upper face wall 8a and the lower face wall 8c and prevented from rotating. Thus, the rear wheel axle 3 is prevented from rotating, and can be easily fastened solely by performing fastening on the axle nut 13 side while leaving the hands free on the head portion 3a side.

Figure 15:
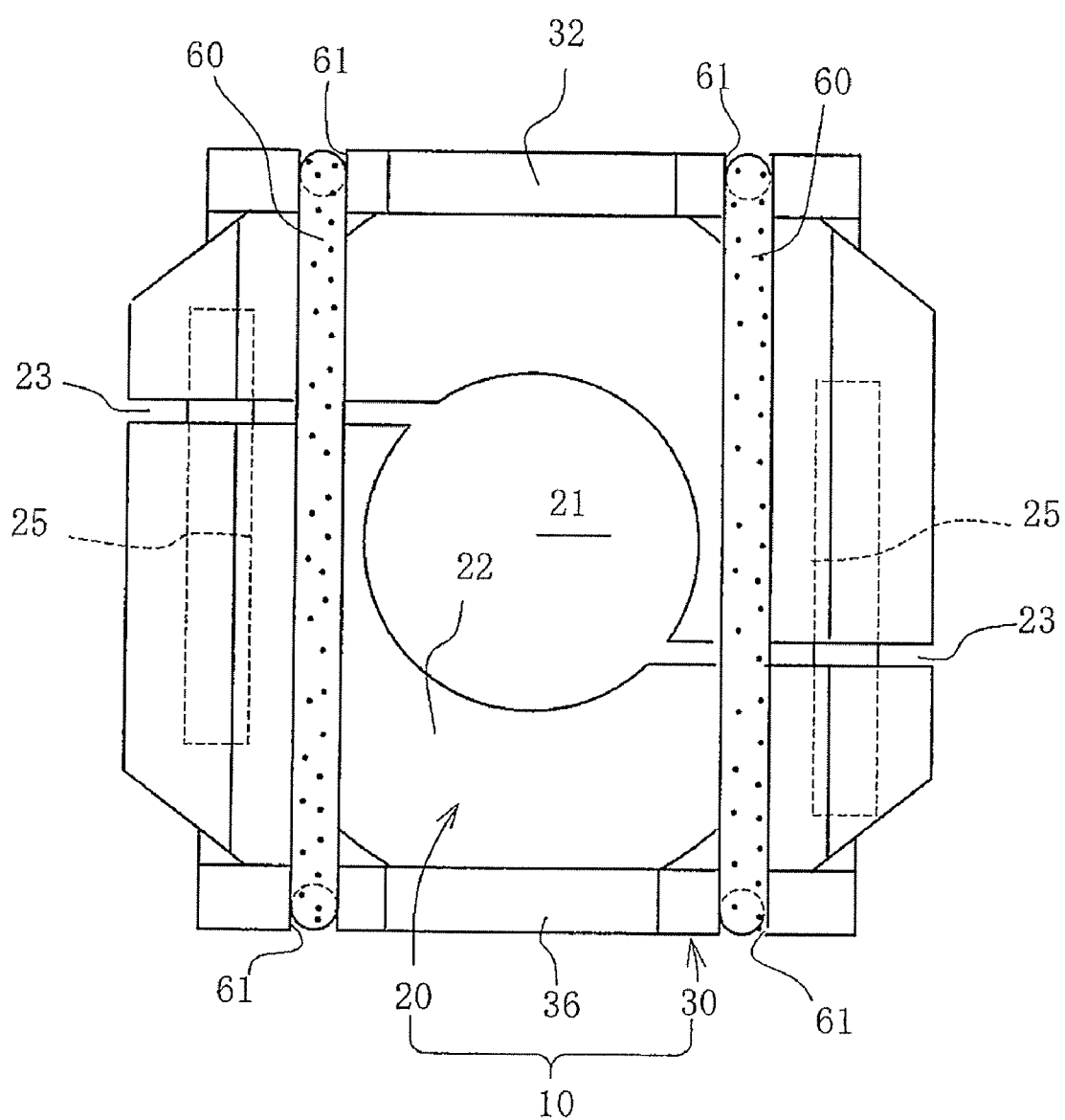
FIG. 15 is a front view of an adjustment member according to the fourth embodiment.
Figure 16:
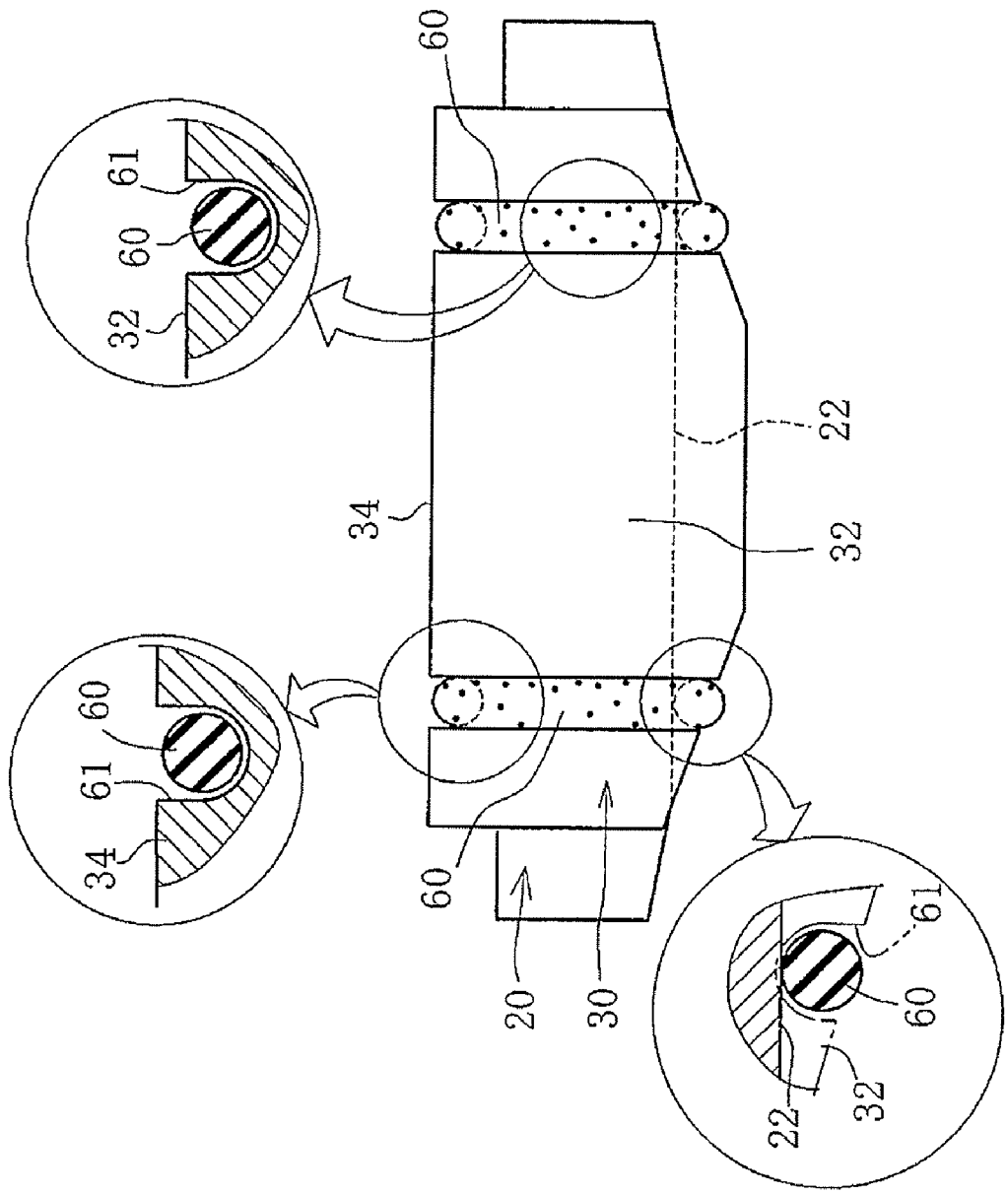
FIG. 16 is a plan view of the adjustment member according to the fourth embodiment.
Figure 17:
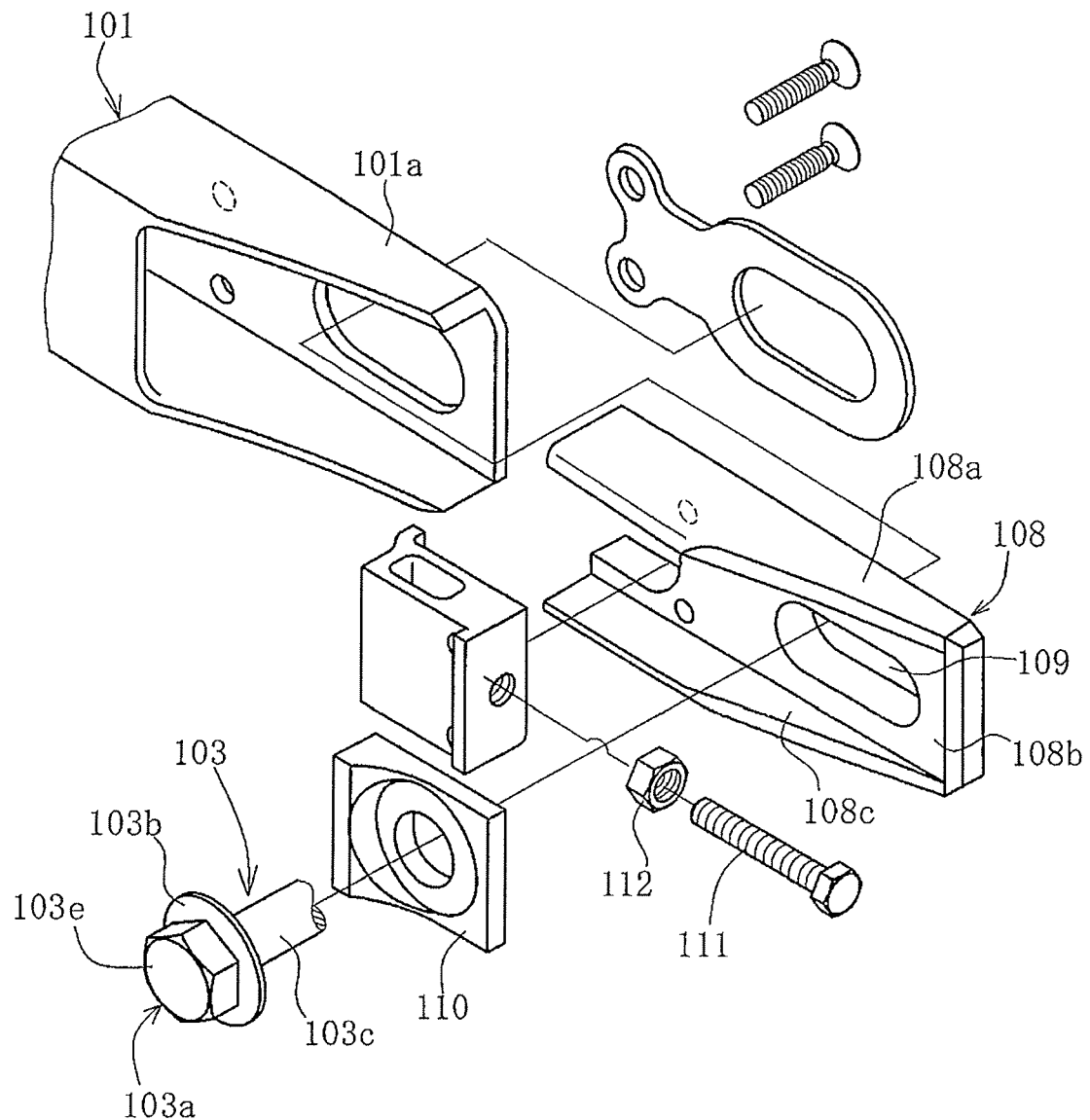
FIG. 17 is an exploded view of a chain adjustment mechanism according to the related art.

FIG. 14 is a perspective view of the adjustment member 10 according to a fourth embodiment, and FIGS. 15 and 16 are a front view and a plan view thereof, respectively.

As shown in FIGS. 14-16, the fourth embodiment is the same as the first embodiment in the formation of the adjustment member 10 by the projecting member 20 and the recessed member 30 and in the projecting member 20 and the recessed member 30, but differs only in that the projecting member 20 and the recessed member 30 are integrated into a sub-assembly in advance by an elastic annular member 60.

The elastic annular member 60 is an annular elastic member made of a rubber band, an annular coil spring, or the like. In the state with the projecting member 20 and the recessed member 30 fitted and integrated with each other, the elastic annular member 60 is hooked over, thereby forming the adjustment member 10 whose projecting member 20 and recessed member 30 are integrated into a sub-assembly so that they do not easily separate from each other.

The elastic annular member 60 is hooked over in the vertical direction at each of the front and rear positions across the shaft hole 21, thereby preventing the split bodies 20A and 20B of the projecting member 20 and the upper split body 30A and lower split body 30B of the recessed member 30 from separating upwards and downwards, respectively.

However, that it is possible to separate and move the split bodies 20A and 20B, and the upper split body 30A and the lower split body 30B upwards and downwards respectively while elastically deforming the elastic annular member 60 at the time of fastening of the rear wheel axle 3, and as required, the upper and lower split bodies 20A and 20B are guided by the guide pin 25. However, the projecting member 20 may be a unitary member that is not split vertically.

The elastic annular member 60 is placed in a groove 61 so as to be flush with the outer surface of the adjustment member 10 when wound around the adjustment member 10.

As illustrated in FIG. 16 showing an enlarged cross-section of the fitting state of the elastic annular member 60 with the groove 61 in each of the inner side face 34, and the upper face and the distal end of the upper wall 32, the groove 61 is formed in the outer surface of each of the upper wall 32 and lower wall 36 and in the outer surface of the inner side face 34 of each of the upper split body 30A and lower split body 30B, so that the elastic annular member 60 does not contact the end piece member when the upper wall 32, the lower wall 36, and the inner side face 34 are brought into sliding contact with the end piece member, thereby allowing smooth sliding of the upper split body 30A and the lower split body 30B.

As for the outer surface of each of the split bodies 20A and 20B which is not brought into sliding contact with the end piece member, the groove 61 is not provided, and the elastic annular member 60 is simply placed in contact with the outer surface.

Forming the adjustment member 10 as an integral subassembly by means of the elastic annular member 60 in this way allows for easy handling even through the adjustment member 10 is made up of a plurality of split portions.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A chain adjustment apparatus for a motorcycle, said motorcycle comprising
    a rear fork attached to a vehicle body or an engine so as to freely swing up and down, said rear fork supporting a rear wheel at a rear end portion thereof via a rear wheel axle; and
    a chain which transmits a driving force of the engine to a driven sprocket of the rear wheel;
    said chain adjustment apparatus comprising:
    an end piece member attached to said rear end portion of the rear fork; a portion of said end piece member having an elongated opening and an adjustment recess formed therein; and
    an adjustment member fitted in the adjustment recess so as to slidably move in forward and backward directions therein;
    wherein:
    the rear wheel axle extends through the elongated opening and the adjustment member;
    tension of the chain is adjusted by adjusting a position of the adjustment member to cause the rear wheel axle to be moved while being guided by the elongated opening;
    the adjustment member has an axle hole formed therein through which the rear wheel axle is extended, said adjustment member being operable to move in an axial direction of the rear wheel axle,
    said adjustment member includes a projecting member having an inner side face including a substantially V-shaped projecting slope whose vertically central portion projects toward the inner side of the vehicle body, said inner side face facing toward an inner side of the vehicle body, and a recessed member having a substantially V-shaped recessed slope above and below the elongated opening, and
    wherein said adjustment member is formed by the projecting member and the recessed member fitted together such that the substantially V-shaped projecting slope and the substantially V-shaped recessed slope are brought into sliding contact with each other, and
    wherein the adjustment member fits into the adjustment recess having a substantially C-shaped cross section which is formed in a portion of the end piece member including the elongated opening.

2. A chain adjustment apparatus for a motorcycle according to claim 1, wherein the projecting member is split vertically in two portions.

3. A chain adjustment apparatus for a motorcycle according to claim 1, further comprising a stopper portion formed by folding over a portion around a head portion of the rear wheel axle.

4. A chain adjustment apparatus for a motorcycle according to claim 1, wherein the projecting member and the recessed member are overlapped with each other and integrated into a sub-assembly by an elastic annular member.

5. A fork for a motorcycle, comprising:
    an arm member for supporting a wheel at an end portion thereof; wherein during operation of the motorcycle, said wheel is rotated by a driving force of an engine transmitted to a driven sprocket of the wheel via a chain;
    an end piece member attached to the end portion of the arm member; said end piece member having an elongated opening and an adjustment recess formed therein, said adjustment recess being formed on an outer lateral side of the end piece member; and
    an adjustment member fitted in the adjustment recess so as to slidably move in a longitudinal direction therein;
    wherein:
    an axle of the wheel extends through the elongated opening and the adjustment member;
    tension of the chain is adjusted by adjusting a position of the adjustment member to cause the axle to be moved while being guided by the elongated opening;
    the adjustment member has an axle hole formed therein through which the axle is extended, said adjustment member is operable to move in an axial direction of the axle,
    said adjustment member includes:
        a projecting member having an inner side face including a substantially V-shaped projecting slope whose vertically central portion projects toward an inner side of a vehicle body, said inner side face facing toward the inner side of the vehicle body; and
        a recessed member having a substantially V-shaped recessed slope above and below the elongated opening;
    the adjustment member is fitted into the adjustment recess, and both the substantially V-shaped projecting slope of the projecting member and the substantially V-shaped recessed slope of the recessed member are brought into sliding contact with each other.

6. A fork for a motorcycle according to claim 5, wherein said recessed member is separate from the end piece member, and wherein the recessed member fits into the adjustment recess having a substantially C-shaped cross section which is formed in a portion of the end piece member including the elongated opening.

7. A fork for a motorcycle according to claim 5, wherein the projecting member is split vertically in two portions.

8. A fork for a motorcycle according to claim 6, wherein the projecting member is split vertically in two split portions.

9. A fork for a motorcycle according to claim 7, wherein said two portions are upper and lower split portions, and each of said upper and lower split portions includes a guide hole formed therein; wherein a guide pin is inserted in each of the guide holes for coupling said upper and lower split portions together.

10. A fork for a motorcycle according to claim 5, further comprising a stopper portion formed by folding over a portion around a head portion of the axle.

11. A chain adjustment apparatus for a motorcycle, said motorcycle comprising:
    a fork attached to a vehicle body or an engine so as to freely swing up and down, said fork supporting a wheel at an end portion thereof via a wheel axle; and
    a chain which transmits a driving force of the engine to a driven sprocket of the wheel;
    said chain adjustment apparatus comprising:
    an end piece member attached to said end portion of the fork; said end piece member having an elongated opening and an adjustment recess formed therein, said adjustment recess being formed on an outer lateral side of the end piece member; and an adjustment member fitted in the adjustment recess so as to slidably move in forward and backward directions therein; said adjustment member having an axle hole formed therein;

wherein:

the wheel axle extends through the elongated opening and the axle hole of the adjustment member;

tension of the chain is adjusted by adjusting a position of the adjustment member to cause the wheel axle to be moved while being guided by the elongated opening;

said adjustment member includes:
- a projecting member having an inner side face including a substantially V-shaped projecting slope whose vertically central portion projects toward an inner side of the vehicle body, said inner side face facing toward the inner side of the vehicle body; projecting member being split vertically in two portions; and
- a recessed member having a substantially V-shaped recessed slope above and below the elongated opening; and the projecting member is fitted into the recess, and both the substantially V-shaped projecting slope and the substantially V-shaped recessed slope are brought into sliding contact with each other.

12. A chain adjustment apparatus for a motorcycle according to claim 11, wherein said recessed member is separate from the end piece member, and the adjustment member is formed by said two portions of the projecting member and the recessed member, and wherein the recessed member fits into the adjustment recess having a substantially C-shaped cross section which is formed in a portion of the end piece member including the elongated opening.

13. A chain adjustment apparatus for a motorcycle according to claim 11, wherein said two portions are upper and lower split portions, and each of said upper and lower split portions includes a guide hole formed therein; wherein a guide pin is inserted in each of the guide hole for coupling said upper and lower split portions together such that said upper and lower split operable to move for adjusting a distance therebetween.

* * * * *